United States Patent
Chano et al.

(10) Patent No.: US 11,425,542 B2
(45) Date of Patent: Aug. 23, 2022

(54) SEMICONDUCTOR DEVICE, RADIO TERMINAL DEVICE, RADIO COMMUNICATION SYSTEM AND COMMUNICATION METHOD OF RADIO TERMINAL DEVICE

(71) Applicant: RENESAS ELECTRONICS CORPORATION, Tokyo (JP)

(72) Inventors: Hiroshi Chano, Tokyo (JP); Suguru Fujita, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 136 days.

(21) Appl. No.: 16/671,960

(22) Filed: Nov. 1, 2019

(65) Prior Publication Data
US 2020/0204965 A1    Jun. 25, 2020

(30) Foreign Application Priority Data
Dec. 20, 2018   (JP) .............................. JP2018-238713

(51) Int. Cl.
*H04W 4/40*       (2018.01)
*H04W 72/00*      (2009.01)
(Continued)

(52) U.S. Cl.
CPC ............ *H04W 4/40* (2018.02); *H04B 17/327* (2015.01); *H04W 56/0045* (2013.01); *H04W 64/006* (2013.01); *H04W 72/005* (2013.01)

(58) Field of Classification Search
CPC ............................................... H04W 56/0045
See application file for complete search history.

(56) References Cited

U.S. PATENT DOCUMENTS 8,705,561 B2 *  4/2014  Ito .................... H04B 7/2606
                                                          370/445
8,971,297 B2    3/2015  Otani et al.
(Continued)

FOREIGN PATENT DOCUMENTS

| JP | 2010-124330 A | 6/2010 |
| JP | 2010-154309 A | 7/2010 |
| WO | 2013/161439 A1 | 10/2013 |

OTHER PUBLICATIONS

Japanese Notice of Reasons for Refusal issued in corresponding Japanese Patent Application No. 2018-238713, dated Jun. 14, 2022, with English translation.

*Primary Examiner* — Edan Orgad
*Assistant Examiner* — Won Tae C Kim
(74) *Attorney, Agent, or Firm* — McDermott Will & Emery LLP

(57) ABSTRACT

A semiconductor device includes a communication unit which receives a frame at a first transmission period, demodulates control information from a received frame, modulates transmission data, and broadcasts a modulated transmission data at a second transmission period as a radio frequency packet signal, a period determination unit which determines the second transmission period based on vehicle information, and a transmission and reception control unit which generates a transmission timing trigger signal for determining a transmission timing of the transmission data based on the control information and the second transmission period, and outputs the transmission data to the communication unit in synchronization with the transmission timing trigger signal. The second transmission period is equal to or longer than the first transmission period.

7 Claims, 23 Drawing Sheets

(51) Int. Cl.
*H04B 17/327* (2015.01)
*H04W 56/00* (2009.01)
*H04W 64/00* (2009.01)

(56) References Cited

U.S. PATENT DOCUMENTS

| | | |
|---|---|---|
| 9,949,092 B2 | 4/2018 | Yamasaki et al. |
| 2018/0115970 A1* | 4/2018 | Chae ..................... G08G 1/056 |
| 2019/0069257 A1* | 2/2019 | Iwakiri ................. H04W 88/04 |
| 2019/0297475 A1* | 9/2019 | Hatayama ............ H04B 1/3822 |
| 2021/0037494 A1* | 2/2021 | Tamaki ............... H04W 84/005 |

* cited by examiner

FIG. 6

FIRST VEHICLE INFORMATION TABLE

| VEHICLE SPEED | | VEHICLE POSITION | |
|---|---|---|---|
| SPEED PER HOUR [k/h] | C1 | DISTANCE [m] | C2 |
| 0–10 | 2 | 0–50 | 0 |
| 11–30 | 1 | 51–100 | 1 |
| 31– | 0 | 101– | 2 |

FIG. 7

SECOND VEHICLE INFORMATION TABLE

| ROAD INFORMATION | | CONGESTION DEGREE STATISTICS INFORMATION | | WEATHER INFORMATION | |
|---|---|---|---|---|---|
| NUMBER OF LANES | C3 | CONGESTION DEGREE LEVEL | C4 | WEATHER | C5 |
| 1 | 0 | 0–1 | 0 | FINE, CLOUDY | 0 |
| 2–3 | 1 | 2–3 | 1 | RAINY, SNOWY, FOGGY | −1 |
| 4– | 2 | 4– | 2 | — | — |

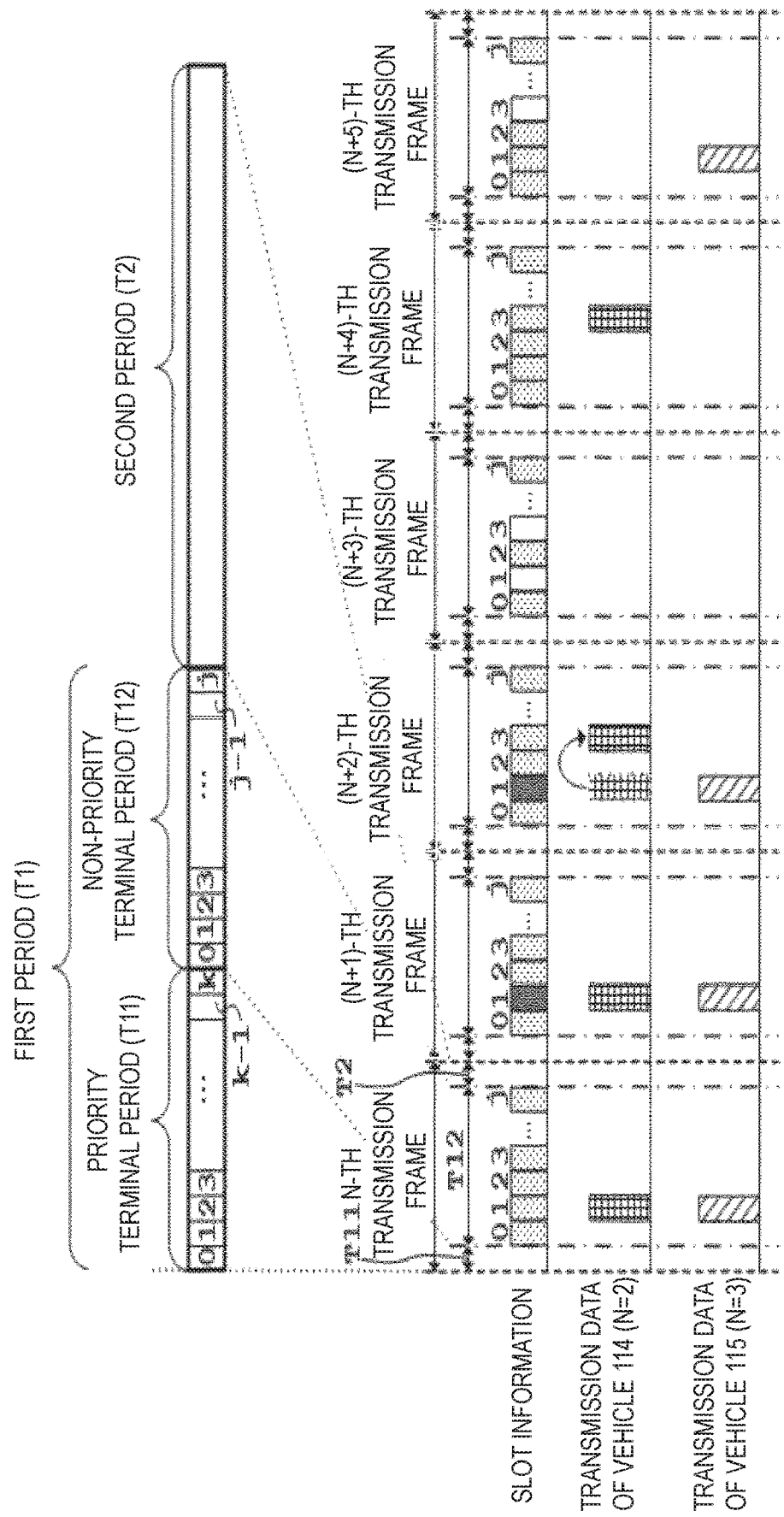

SEMICONDUCTOR DEVICE, RADIO TERMINAL DEVICE, RADIO COMMUNICATION SYSTEM AND COMMUNICATION METHOD OF RADIO TERMINAL DEVICE

CROSS-REFERENCE TO RELATED APPLICATIONS

The disclosure of Japanese Patent Application No. 2018-238713 filed on Dec. 20, 2018 including the specification, drawings and abstract is incorporated herein by reference in its entirety.

BACKGROUND

The present disclosure relates to a semiconductor device, a radio terminal device, a radio communication system and a communication method of the radio terminal device.

THE BACKGROUND OF THE INVENTION

Road-to-vehicle communication and vehicle-to-vehicle communication are radio communication systems that support safe driving, which is being researched and developed for the purpose of traffic safety, accident prevention, and traffic congestion alleviation. In the road-to-vehicle communication, vehicles and infrastructure equipment (road-to-vehicle equipment, etc.) perform radio communication, and the vehicles obtain signal information and regulatory information from the infrastructure to support safe driving by drivers. In the vehicle-to-vehicle communication, vehicles perform radio communication with each other, and vehicle speed information, vehicle position information, and the like is exchanged between an own vehicle and another vehicle, thereby supporting the safe driving of drivers.

In the radio communication systems for the road-to-vehicle communication and the vehicle-to-vehicle communication, various communication methods for data transmission and reception between communication devices have been proposed. For example, a radio communication system including an access control device (road-to-vehicle equipment) and a terminal device (on-vehicle equipment) disclosed in Japanese unexamined Patent Application publication No. 2010-124330 transmits and receives data by using a frame including a first period and a second period, and repeatedly transmitted from the access control device. Depending on a distance from the access control device, the terminal device selects either the first period or the second period as a period to be used for data transmission. The first period is further divided into a plurality of slots, and the terminal device which transmits data by selecting the first period selects a slot to be used for communication. The access control device manages idle slot information and collision slot information, thereby reducing a collision probability of transmission data between the terminal devices.

SUMMARY

The access control device is installed at a location where there is a high-risk of traffic accidents, such as at an intersection. Many vehicles gather in places with high-risk of traffic accidents such as intersections. When many vehicles simultaneously perform data transmission, a sufficient band for radio communication cannot be secured, and the road-to-vehicle communication and the vehicle-to-vehicle communication cannot be properly performed. However, in Japanese unexamined Patent Application publication No. 2010-124330, since such a viewpoint is not considered, there is a possibility that the radio communication cannot be properly performed because all bands in the frame are filled.

Other objects and new features will be apparent from the description of this specification and the accompanying drawings.

A semiconductor device according to one embodiment is a semiconductor device for controlling a radio terminal device mounted on a vehicle, and includes a communication unit which receives a frame transmitted from a radio control device at a first transmission period, demodulates control information from a received frame, modulates transmission data, and broadcasts a modulated transmission data at a second transmission period as a radio frequency packet signal, a period determination unit which determines the second transmission period based on vehicle information, and a transmission and reception control unit which generates a transmission timing trigger signal for determining a transmission timing of the transmission data based on the control information and the second transmission period, and outputs the transmission data to the communication unit in synchronization with the transmission timing trigger signal. The second transmission period is set to be equal to or longer than the first transmission period.

A semiconductor device according to another embodiment is a semiconductor device for controlling a radio terminal device mounted on a vehicle, and includes a communication unit which receives a frame transmitted from a radio control device, and transmits a transmission data in synchronization with a received frame, a period determination unit which determines a transmission period of the transmission data based on vehicle information, and a transmission and reception control unit which operates in a transmission operation mode of any one of a first transmission operation mode and a second transmission operation mode based on a determined transmission period. In the first transmission operation mode, the transmission and reception control unit controls a transmission timing of the transmission data so as to output the transmission data to the communication unit each time the frame is received. In the second transmission operation mode, the transmission and reception control unit controls the transmission timing of the transmission data so as to include a case where the transmission data is output to the communication unit in response to a received frame and a case where the transmission data is not output to the communication unit in response to a received frame.

A communication method according to yet another embodiment is a communication method of a radio terminal device mounted on a vehicle, and includes receiving control information transmitted from a radio control device at a first transmission period, obtaining vehicle information, determining a second transmission period of transmission data based on the vehicle information obtained by the obtaining, generating a transmission timing trigger signal for determining a transmission timing of the transmission data based on the control information received by the receiving and the second transmission period determined by the determining, and transmitting the transmission data at the second transmission period in synchronization with the transmission timing trigger signal generated by the generating. The second transmission period is set to be equal to or longer than the first transmission period.

In the semiconductor device according to one embodiment, even in a place where many vehicles gather, it is possible to reduce a situation in which communication of a vehicle with a high priority for information transmission is hindered.

BRIEF DESCRIPTION OF THE DRAWINGS

FIG. 6 is a diagram showing an example of a vehicle information table according to one embodiment.

FIG. 7 is a diagram showing an example of a vehicle information table according to one embodiment.

FIG. 22 is a timing chart showing an example of a transmission operation of a radio terminal device according to a modification of one embodiment.

DETAILED DESCRIPTION

Figure 1:
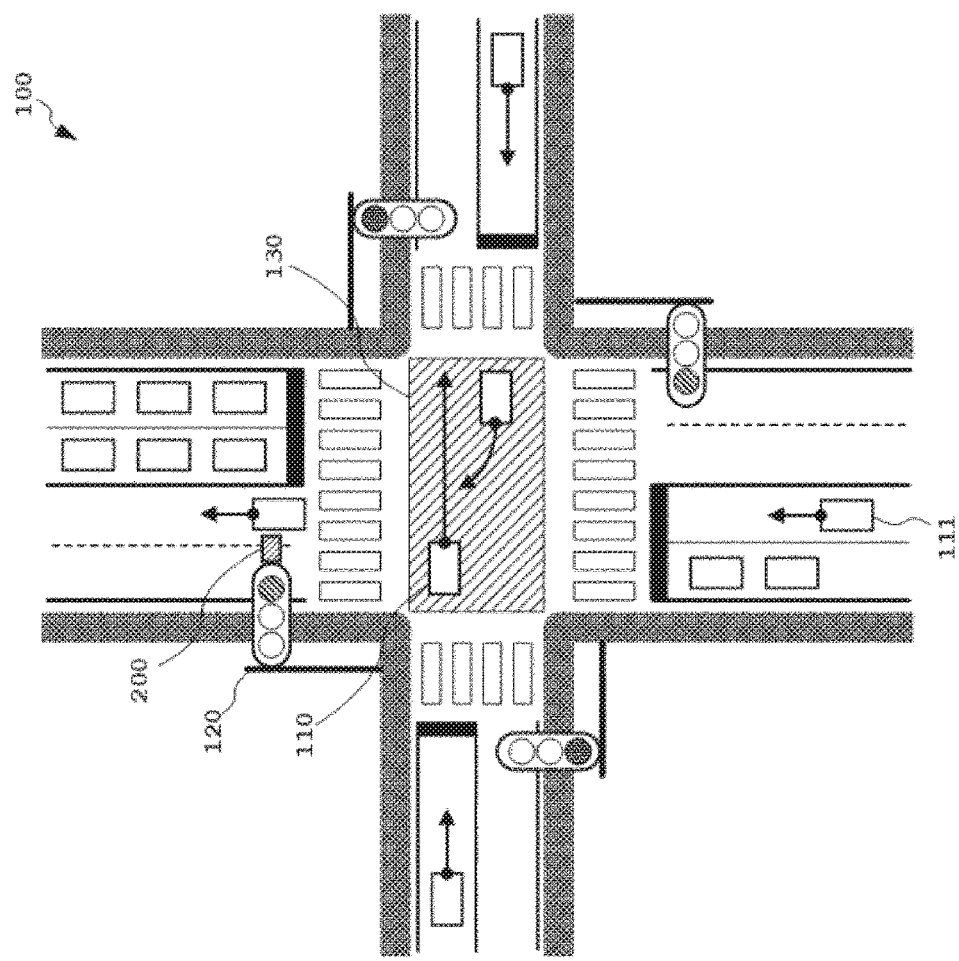
FIG. 1 is a diagram showing an example of a configuration of a communication system according to one embodiment.

Hereinafter, a semiconductor device according to one embodiment will be described in detail by referring to the drawings. In the specification and the drawings, the same or corresponding components are denoted by the same reference numerals, and a repetitive description thereof is omitted. In the drawings, for convenience of description, the configuration may be omitted or simplified. Also, at least some of the embodiments and the modifications may be arbitrarily combined with each other.

First Embodiment

FIG. 1 is a diagram illustrating an example of a configuration of a communication system 100 according to a first embodiment. As shown in FIG. 1, the communication system 100 includes a vehicle 110, a vehicle 111, vehicles which will be described later, and a radio control device 200. Each vehicle mounts a radio terminal device 300 (not shown) which will be described later. Moreover, FIG. 1 shows an intersection where a road heading in an upper and lower direction of the drawing and a road heading in a right and left direction of the drawing intersect. An intersecting part 130 is a part where these two roads cross each other. Each arrow extending from the vehicle indicates a travelling direction of the vehicle. In FIG. 1, since a signal of the road heading in the upper and lower direction is a red signal, the vehicles traveling on the road heading in the upper and lower direction are stopped or slowing down for stopping. On the other hand, since a signal of the road heading in the left and right direction is a blue signal, the vehicles traveling on the road heading in the left and right direction are going straight or stopped at the intersection for a right turn. Although the radio control device 200 is installed in a traffic light 120 in FIG. 1, a place where the radio control device 200 is installed is not limited to this. The radio terminal device 300 of each vehicle need only be located within a communication range of the radio control device 200. For example, the radio control device 200 may be installed in a building or a vending machine located near the traffic light 120, or may be buried underground. Further, the radio control device 200 may be installed at an intersection where no traffic signal is arranged. Furthermore, the radio control device 200 is not limited to being installed in an intersection, and may be installed, for example, near a corner of a road with poor visibility.

Radio communication between the radio control device 200 and the radio terminal device 300 of each vehicle, and radio communication between the radio terminal devices 300 of each vehicle are performed using a transmission frame including control information transmitted from the radio control device 200. Details of the control information and the transmission frame will be described later. In FIG. 1, the radio control device 200 transmits a transmission frame including the control information to the vehicle 110, the vehicle 111, and vehicles to which a reference numeral is not attached by broadcast type radio communication. In addition to the control information, the transmission frame includes, for example, traffic signal information, regulation information, pedestrian information, and the like. The traffic signal information, the regulation information, the pedestrian information, and the like can be provided even in a blind spot condition for a driver, and the safe driving of the driver is supported. In addition, the radio terminal device 300 of each vehicle receives a transmission frame transmitted from the radio control device 200, and transmits and receives data by broadcast type radio communication in synchronization with the received transmission frame. Data transmitted from the radio terminal device 300 of each vehicle includes speed information, position information, vehicle control information, and the like of an own vehicle. By providing speed information, position information, and the like of a vehicle, which is hidden behind things and becomes a blind spot for the driver, between vehicles, the safe driving of the driver is supported.

Figure 2:
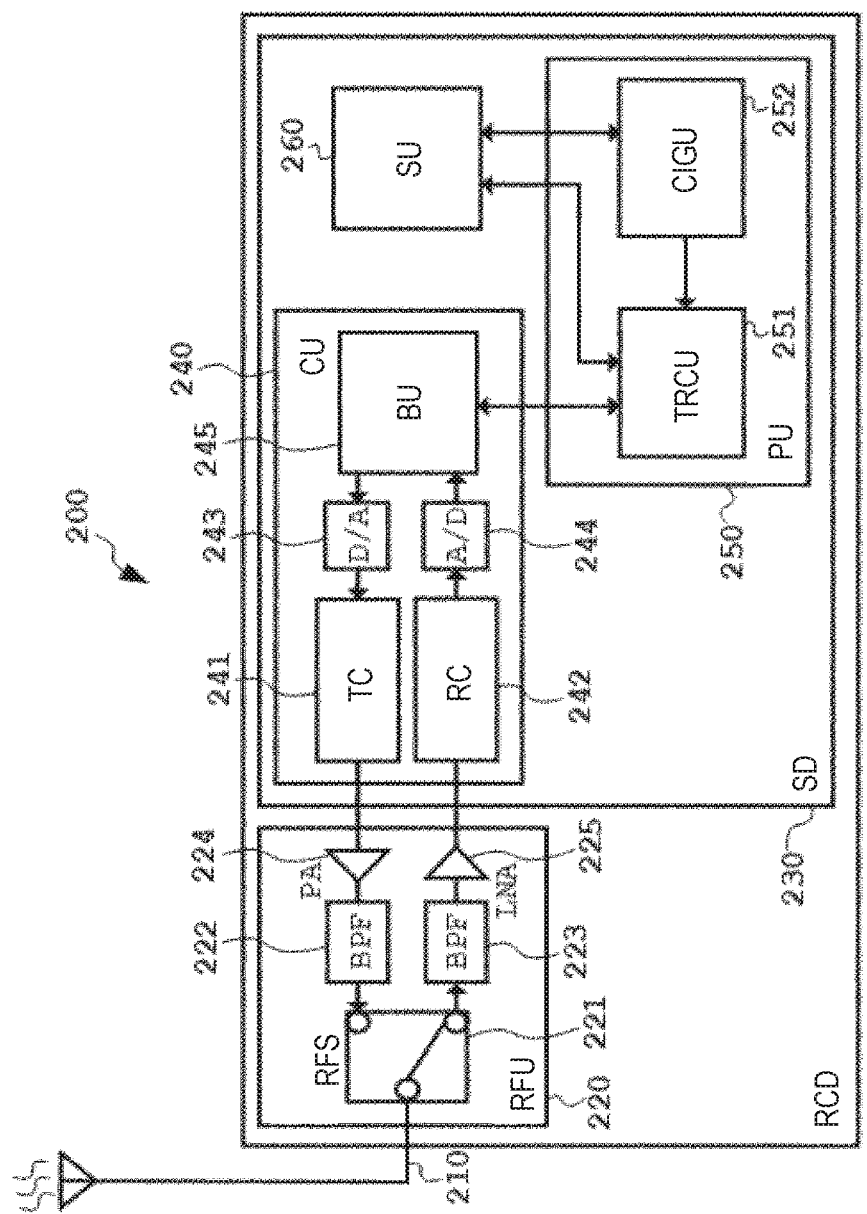
FIG. 2 is a block diagram showing an example of a configuration of a radio control device according to one embodiment.

Next, a configuration of the radio control device 200 according to the first embodiment will be described. FIG. 2 is a block diagram showing an example of the configuration of the radio control device (RCD) 200 according to the first embodiment. As shown in FIG. 2, the radio control device 200 includes an antenna 210, a radio frequency unit (RFU) 220, and a semiconductor device (SD) 230. The radio control device 200 performs data communication with the radio terminal device 300 mounted on a vehicle in an intersection or near a corner of a road with poor visibility. Here, an Orthogonal Frequency Division Multiplexing (OFDM) method is adopted as a modulation method, but the modulation method is not limited to this, and a Time Division Multiple Access (TDMA) method or a Frequency Division Multiple Access (FDMA) method may be adopted. Among these modulation methods, the OFDM method is suitable for the present communication system for preventing a traffic accident because it can increase communication speed compared to the other modulation methods.

The antenna 210 is a device for radiating radio waves or receiving radio waves. The radio frequency unit 220 is connected between the antenna 210 and the semiconductor device 230, and transmits and receives data between the radio terminal device 300 and the semiconductor device 230. The radio frequency unit 220 includes a radio frequency switch (RFS) 221, a band-pass filters (BPF) 222, a BPF 223, a power amplifier (PA) 224, and a low noise amplifier (LNA) 225. The radio frequency switch 221 is connected to the antenna 210, the BPF 222, and the BPF 223, and is a switch for switching a high-frequency signal path used for radio communication. When the radio frequency unit 220 performs transmission processing, the radio frequency switch 221 forms a path connecting the antenna 210 and the BPF 222. On the other hand, when the radio frequency unit 220 performs reception processing, the radio frequency switch 221 forms a path connecting the antenna 210 and the BPF 223.

The BPF 222 is connected between the PA 224 and the radio frequency switch 221, and passes only a signal having a particular frequency out of signals output from the PA 224 to the radio frequency switch 221. The BPF 223 is connected between the radio frequency switch 221 and the LNA 225, and passes only a signal having a particular frequency out of signals output from the radio frequency switch 221 to the LNA 225. The PA 224 is connected between the semiconductor device 230 and the BPF 222, and amplifies a power of a signal output from the semiconductor device 230 and outputs the amplified signal to the BPF 222. The LNA 225 is connected between the BPF 223 and the semiconductor device 230, amplifies a signal output from the BPF 223, and outputs the amplified signal to the semiconductor device 230.

As transmission processing, the radio frequency unit 220 broadcasts a radio frequency packet signal (transmission signal) output from the semiconductor device 230 from the antenna 210 via the PA 224, the BPF 222, and the radio frequency switch 221. On the other hand, as reception processing, the radio frequency unit 220 outputs a radio frequency packet signal (reception signal) received from the antenna 210 to the semiconductor device 230 via the radio frequency switch 221, the BPF 223, and the LNA 225.

The semiconductor device 230 includes a communication unit (CU) 240, a processing unit (PU) 250, and a storage unit (SU) 260. The communication unit 240 is connected between the radio frequency unit 220 and the processing unit 250. The processing unit 250 is connected to the communication unit 240 and the storage unit 260. The communication unit 240 includes a transmission circuit (TC) 241, a reception circuit (RC) 242, a digital-to-analog conversion circuit (D/A) 243, an analog-to-digital conversion circuit (A/D) 244, and a baseband unit (BU) 245. The transmission circuit 241 is connected between the PA 224 and the D/A 243. The D/A 243 is connected between the transmission circuit 241 and the baseband 245. The reception circuit 242 is connected between the LNA 225 and the A/D 244. The A/D 244 is connected between the reception circuit 242 and the baseband 245. The baseband unit 245 is connected to the processing unit 250.

A transmission path of the communication unit 240 includes the transmission circuit 241, the D/A 243, and the baseband unit 245. In the transmission processing, the baseband unit 245 performs modulation processing on transmission data received from the processing unit 250 using the OFDM method to generate a packet signal of a baseband OFDM. The generated baseband OFDM signal is subjected to a digital-to-analog conversion by the D/A 243 and is output to the transmission circuit 241. The transmission circuit 241 performs frequency transform processing on the packet signal of the baseband OFDM received from the D/A 243 to generate a packet signal of a radio frequency. The generated radio frequency packet signal is output to the PA 224.

Further, a reception path of the communication unit 240 includes the reception circuit 242, the A/D 244, and the baseband unit 245. In the reception processing, the reception circuit 242 performs frequency conversion processing on a radio frequency packet signal received from the LNA 225 to generate a packet signal of the baseband OFDM. The generated packet signal of the baseband OFDM is subjected to an analog-to-digital conversion by the A/D 244, and the converted packet signal is output to the baseband unit 245. The baseband unit 245 performs demodulation processing on the received packet signal of the baseband OFDM to generate reception data. The generated reception data is output to the processing unit 250. Note that since the packet signal of the baseband OFDM is formed by an in-phase component and a quadrature component, the packet signal should be originally represented by two signal lines, but only one signal line is shown in FIG. 2 for the sake of clarity.

The processing unit 250 includes a transmission and reception control unit (TRCU) 251 and a control information generation unit (CIGU) 252. The transmission and reception control unit 251 generates transmission data based on control information output from the control information generation unit 252, and outputs the transmission data to the baseband unit 245 at a basic transmission period read out from the storage unit 260. The transmission and reception control unit 251 receives reception data output from the baseband unit 245 and stores the reception data in the storage unit 260.

Figure 3:
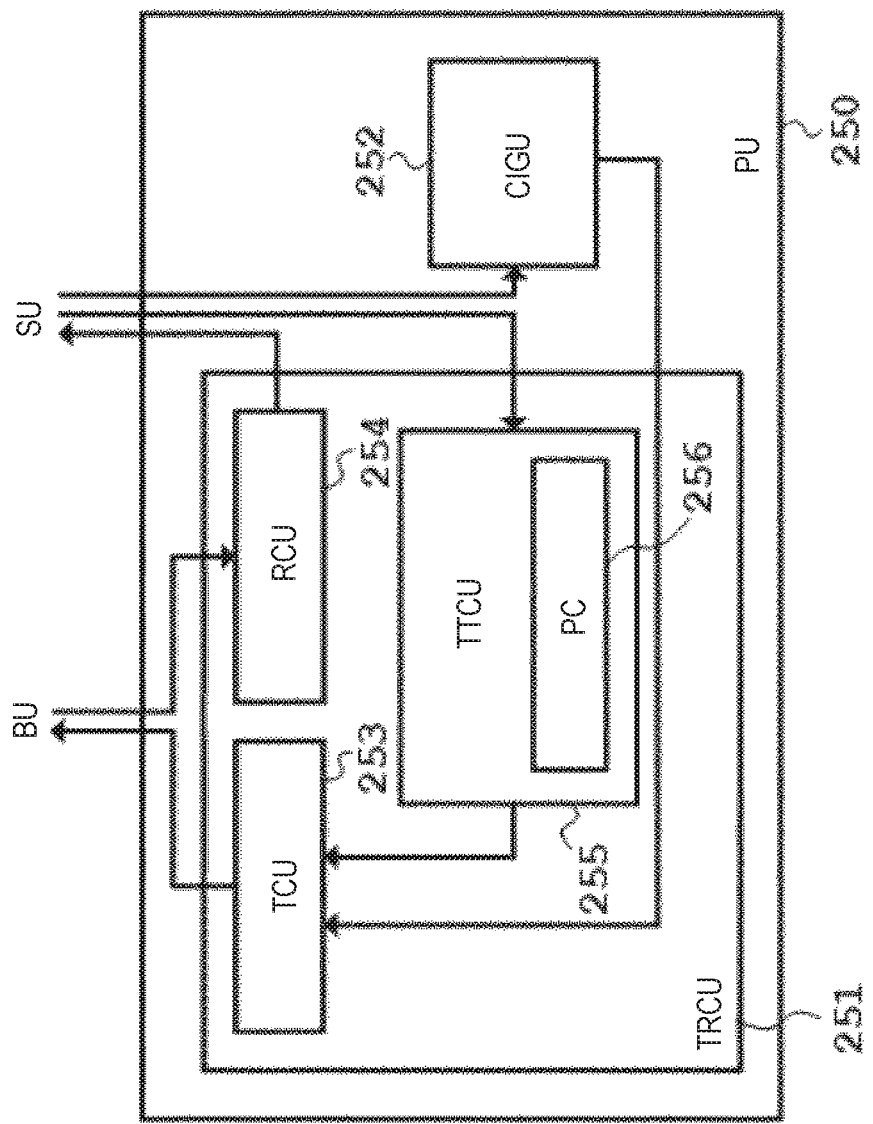
FIG. 3 is a block diagram showing an example of a configuration of a processing unit according to one embodiment.

Further, configurations of the transmission and reception control unit 251 and the control information generation unit 252 will be described in detail with reference to FIG. 3. FIG. 3 is a block diagram showing an example of a detailed configuration of the processing unit 250. As shown in FIG. 3, the transmission and reception control unit 251 includes a transmission control unit (TCU) 253, a reception control unit (RCU) 254, and a transmission timing control unit (TTCU) 255.

The control information generation unit 252 is connected to the storage unit 260 and the transmission control unit 253. The control information generation unit 252 refers to information stored in the storage unit 260 and generates control information. The control information includes at least identification information for enabling the radio terminal device 300 to identify that the packet signal is a packet signal transmitted from the radio control device 200. Other information included in the control information will be described later. The control information generation unit 252 outputs the generated control information to the transmission control unit 253.

The transmission timing control unit 255 is connected to the storage unit 260, and reads out information of the basic transmission period stored in the storage unit 260. The transmission timing control unit 255 generates a plurality of transmission timing trigger signals based on the basic transmission period read from the storage unit 260. More specifically, the transmission timing control unit 255 includes a period counter (PC) 256, and measures a time of the basic transmission period using the period counter 256. The transmission timing control unit 255 generates the transmission timing trigger signal at a timing at which a count value of the period counter 256 reaches a value associated with the basic transmission period, and clears the count value of the period counter 256. By repeating such control, a plurality of transmission timing trigger signals is generated at intervals of the basic transmission period. Further, the transmission timing control unit 255 is connected to the transmission control unit 253, and outputs the generated transmission timing trigger signal to the transmission control unit 253.

The transmission control unit 253 generates transmission data based on the control information received from the control information generation unit 252. The transmission control unit 253 is connected to the baseband unit 245 and outputs the generated transmission data to the baseband unit 245 in response to the transmission timing trigger signal output from the transmission timing control unit 255. As described above, since the transmission timing trigger signal is repeatedly generated at the intervals of the basic transmission period, the transmission control unit 253 repeatedly outputs the transmission data at the intervals of the basic transmission period. In other words, a transmission frame including one piece of transmission data is repeatedly output from the transmission control unit 253 at the intervals of the basic transmission period.

The reception control unit 254 is connected to the baseband unit 245 and the storage unit 260. The reception control unit 254 receives reception data output from the baseband unit 245, and stores the received reception data in the storage unit 260.

Returning to FIG. 2, the description of the configuration of the radio control device 200 will be continued. The storage unit 260 stores information for generating the control information, information on the basic transmission period, and the reception data. The storage unit 260 may be any storage unit capable of storing data, such as a register or a Random Access Memory (RAM), and may be volatile or non-volatile.

In FIG. 2, the semiconductor device 230 is illustrated as including the communication unit 240 the processing unit 250 and the storage unit 260, but the configuration of the semiconductor device 230 is not limited this. For example, the communication unit 240, the processing unit 250, and the storage unit 260 may be formed as separate semiconductor devices. Moreover, the semiconductor device 230 may be formed on one semiconductor chip, or may be formed by dividing the semiconductor chip into a plurality of semiconductor chips.

The semiconductor device 230 can be configured only by hardware (H/W) or by cooperation of H/W and software (S/W). In other words, FIG. 2 and FIG. 3 depict functional blocks realized only by H/W, only by S/W, or by cooperation of H/W and S/W. When the semiconductor device 230 is configured only by H/W, the blocks (communication unit 240, processing unit 250, and storage unit 260) of the semiconductor device 230 are configured by circuits. Moreover, when the semiconductor device 230 is configured by the cooperation of H/W and S/W, for example, the processing unit 250 is configured by a processor, and a function of the processing unit 250 can be realized by the processor reading and executing a predetermined program stored in the storage unit 260. The same applies to the communication unit 240, and for example, a function of the baseband unit 245 can be realized by a processor executing a program. Moreover, the same applies to semiconductor devices of radio control devices in other embodiments which will be described later.

Figure 4:
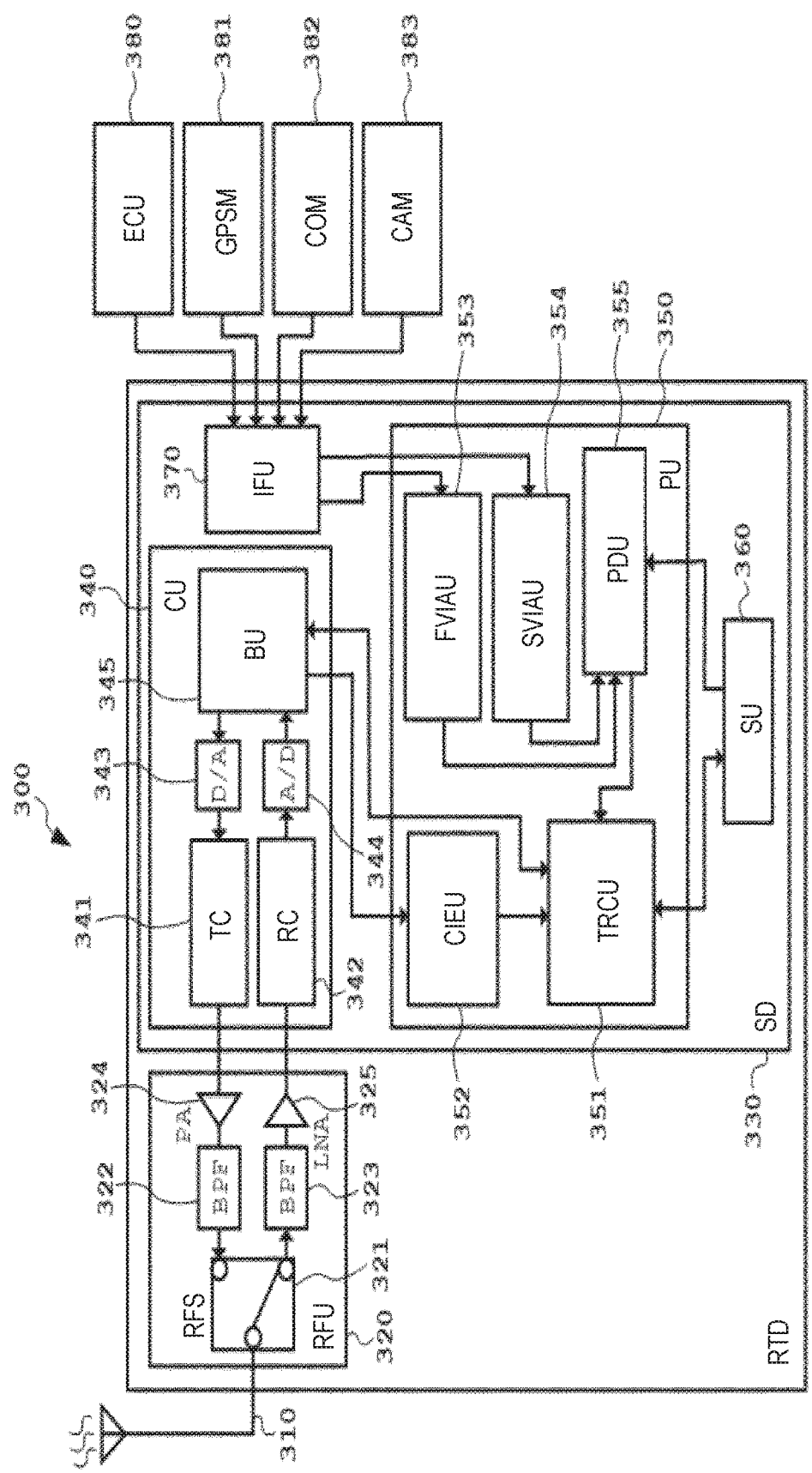
FIG. 4 is a block diagram showing an example of a configuration of a radio terminal device according to one embodiment.

Next, a configuration of the radio terminal device 300 according to the first embodiment will be described. FIG. 4 is a block diagram showing an example of the configuration of the radio terminal device (RTD) 300 according to the first embodiment. The radio terminal device 300 is mounted on a vehicle, and transmits and receives data by broadcast type radio communication to and from the radio control device 200 and the radio terminal device 300 mounted on another vehicle at an intersection or the like. As shown in FIG. 4, the radio terminal device 300 includes an antenna 310, a radio frequency unit (RFU) 320, and a semiconductor device (SD) 330. The radio frequency unit 320 includes a radio frequency switch (RFS) 321, a BPF 332, a BPF 323, a PA 324, and an LNA 325. The semiconductor device 330 includes a communication unit (CU) 340, a processing unit (PU) 350, a storage unit (SU) 360, and an interface unit (IFU) 370. The communication unit 340 includes a transmission circuit (TC) 341, a reception circuit (RC) 342, a D/A 343, an A/D 344, and a baseband unit (BU) 345. The antenna 310, the radio frequency unit 320 (radio frequency switch 321, BPF 332, BPF 323, PA 324, and LNA 325) and the communication unit 340 (transmission circuit 341, reception circuit 342, D/A 343, A/D 344, and baseband unit 345) of FIG. 4 perform the same processing as those of the antenna 210, the radio frequency unit 220 (radio frequency switch 221, BPF 232, BPF 223, PA 224, and LNA 225) and the communication unit 240 (transmission circuit 241, reception circuit 242, D/A 243, A/D 244, and baseband unit 245) of FIG. 2, and therefore, descriptions thereof are omitted here.

The processing unit 350 includes a transmission and reception control unit (TRCU) 351, a control information extraction unit (CIEU) 352, a first vehicle information acquisition unit (FVIAU) 353, a second vehicle information acquisition unit (SVIAU) 354, and a period determination unit (PDU) 355. The control information extraction unit 352 is connected to the baseband unit 345 and the transmission and reception control unit 351. The control information extraction unit 352 receives reception data demodulated by the baseband unit 345, and determines whether or not the received reception data includes control information of the radio control device 200. When the reception data includes identification information of the radio control device 200, the control information extraction unit 352 determines that the reception data is the transmission data transmitted from the radio control device 200, and extracts the control information. The control information extraction unit 352 generates timing adjustment information based on the extracted control information, and outputs the timing adjustment information to the transmission and reception control unit 351. Since the control information is transmitted from the radio control device 200 at the basic transmission period, the timing adjustment information is generated every time the transmission frame is received at the intervals of the basic transmission period.

The first vehicle information acquisition unit 353 is connected to an electronic control unit (ECU) 380 and a global positioning system module (GPSM) 381, which are located outside the radio terminal device 300, via the interface unit 370, and acquires first vehicle information from the electronic control unit 380 and the global positioning system module 381. Specifically, the first vehicle information acquisition unit 353 acquires vehicle speed information of an own vehicle from the electronic control unit 380, and acquires vehicle position information of an own vehicle from the global positioning system module 381. Further, the first vehicle information acquisition unit 353 is connected to the period determination unit 355, and outputs the acquired first vehicle information, (for example, one or both of the vehicle speed information and the vehicle position information), to the period determination unit 355.

The second vehicle information acquisition unit 354 is connected to a communication module (COM) 382 and a camera module (CAM) 383 located outside the radio terminal device 300 via the interface unit 370, and acquires second vehicle information from the communication module 382 and the camera module 383. More specifically, the second vehicle information acquisition unit 354 acquires, from the communication module 382 or the camera module 383, road information of a road on which an own vehicle travels and weather information of a region on which an own vehicle travels, and acquires, from the communication module 382, congestion degree statistics information of a road on which an own vehicle travels. Further, the second vehicle information acquisition unit 354 is connected to the period determination unit 355, and outputs the acquired second vehicle information (for example, any one or two or all of the road information, the congestion degree statistics information, and the weather information) to the period determination unit 355. Thus, the first vehicle information corresponds to information relating to the vehicle itself, whereas the second vehicle information corresponds to information external to the vehicle, i.e. environmental information relating to the road or region on which the vehicle is travelling, rather than the information of the vehicle itself.

The period determination unit 355 determines a parameter N (N value) based on the vehicle information (one or both of the first vehicle information and the second vehicle information) received from the first vehicle information acquisition unit 353 and the second vehicle information acquisition unit 354 and a vehicle information table (one or both of a first vehicle information table and a second vehicle information table) stored in the storage unit 360. The N value is used to determine a transmission period of transmission data of the radio terminal device 300. That is, the period determination unit 355 has a function of determining the transmission period of the transmission data of the radio terminal device 300 by determining the N value. Moreover, the period determination unit 355 is connected to the transmission and reception control unit 351, and outputs the determined N value to the transmission and reception control unit 351.

The transmission and reception control unit 351 generates a transmission timing trigger signal based on timing adjustment information output from the control information extraction unit 352 and the N value (transmission period) determined by the period determination unit 355. The transmission and reception control unit 351 is connected to the baseband unit 345, and outputs transmission data to the baseband unit 345 in synchronization with the generated transmission timing trigger signal. The transmission and reception control unit 351 also receives data transmitted from the radio terminal device 300 mounted on another vehicle via the baseband unit 345.

Figure 5:
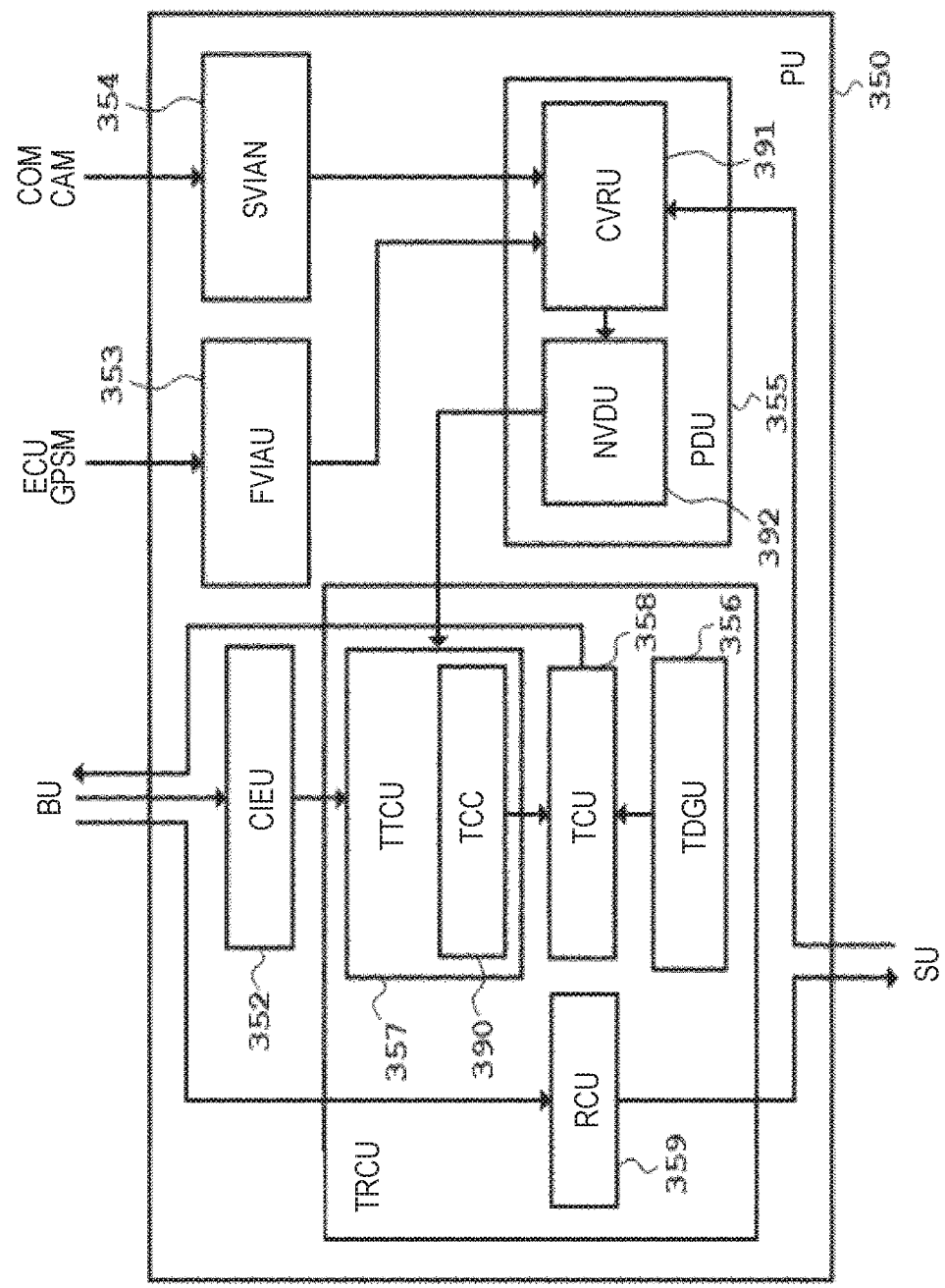
FIG. 5 is a block diagram showing an example of a configuration of a processing unit according to one embodiment.

Further, configurations of the period determination unit 355 and the transmission and reception control unit 351 will be described in detail with reference to FIG. 5. FIG. 5 is a block diagram showing an example of a detailed configuration of the processing unit 350. As shown in FIG. 5, the period determination unit 355 includes a correction value reading unit (CVRU) 391 and an N value determination unit (NVDU) 392. The transmission and reception control unit 351 includes a transmission data generation unit (TDGU) 356, a transmission timing control unit (TTCU) 357, a transmission control unit (TCU) 358, and a reception control unit (RCU) 359.

The correction value reading unit 391 is connected to the first vehicle information acquisition unit 353, the second vehicle information acquisition unit 354, and the storage unit 360. The correction value readout unit 391 reads out correction values corresponding to first vehicle information received from the first vehicle information acquisition unit 353 and second vehicle information received from the second vehicle information acquisition unit 354, respectively, with reference to the first and second vehicle information tables stored in the storage unit 360.

Here, the first vehicle information table and the second vehicle information table stored in the storage unit 360 will be described. FIG. 6 is a diagram showing an example of the first vehicle information table. The first vehicle information table is associated with first vehicle information, and is a vehicle information table that defines a first correction value (C1) and a second correction value (C2) for adjusting an N value, namely a transmission period of transmission data of the radio terminal device 300. As shown in FIG. 6, the first vehicle information table includes two items, i.e., a vehicle speed and a vehicle position, and the C1 and the C2 are associated with a speed per hour and a distance, respectively.

In the vehicle speed, a value of the C1 is set to be smaller as a value of the speed per hour is larger. In the vehicle position, a value of the C2 is set to be smaller as a value of the distance is smaller. The distance of the vehicle position in FIG. 6 indicates a distance from the end of the intersecting part 130 to an own vehicle in FIG. 1. Therefore, vehicles located within the intersecting part 130 are considered to be a distance 0 m.

For example, when a vehicle speed of an own vehicle acquired from the first vehicle information acquisition unit 353 is 15 km/h, the correction value reading unit 391 reads out 1 as a value of the C1 with reference to the first vehicle information table. When the information on a vehicle position of an own vehicle is acquired from the first vehicle information acquisition unit 353, the correction value reading unit 391 calculates a distance from the intersecting part 130 to the own vehicle based on the information on the vehicle position of the own vehicle. At this time, for example, when the distance from the intersecting part to the own vehicle is 20 m, the correction value reading unit 391 reads out 0 as a value of the C2 with reference to the first vehicle information table.

FIG. 7 is a diagram showing an example of the second vehicle information table. The second vehicle information table is associated with second vehicle information, and is a vehicle information table that defines a third correction value (C3), a fourth correction value (C4), and a fifth correction value (C5) for adjusting an N value, namely a transmission period of transmission data of the radio terminal device 300. As shown in FIG. 7, the second vehicle information table includes three items of road information, congestion degree statistics information, and weather information, and the C3 to C5 are associated with a lane, a congestion degree level, and weather, respectively.

In the road information, the C3 is set to be smaller as the number of lanes is smaller. In the congestion degree statistics information, the C4 is set to be smaller as a value of the congestion degree level is smaller. The congestion degree level indicates a degree of congestion obtained from a past congestion state (statistical information) of a road around an own vehicle in a time zone of a current time. In the weather information, the C5 is set to a small value (negative value) with respect to weather (rainy, snowy, foggy) having a large influence on radio communication and an appliance of a vehicle. Generally, when weather is rainy, snowy, or foggy, deterioration of the environment of the radio communication and deterioration of an image recognition accuracy are caused by attenuation of radio waves and an adhesion of water droplets to the antenna and the camera.

The second vehicle information acquisition unit 354 is connected to an internet line via the communication module 382, and can acquire road information (number of lanes), congestion degree level, and weather information around an own vehicle by receiving various cloud services. For example, when the number of lanes is two, congestion degree level is 1, and weather is rainy, the correction value reading unit 391 reads out 1 as a value of the C3, 0 as a value of the C4, and −1 as a value of the C5 by referring to the second vehicle information table.

The correction value reading unit 391 can also specify the number of lanes and weather around an own vehicle by analyzing a captured image around the own vehicle acquired from the camera module 383 via the second vehicle information acquisition unit 354.

The correction value reading unit 391 is connected to the N value determination unit 392, and outputs the C1 to C5 read from the storage unit 360 to the N value determination unit 392.

The N value determination unit 392 determines an N value based on the C1 to C5 received from the correction value reading unit 391. A specific procedure for determining an N value will be described later. Moreover, the N value determination unit 392 is connected to the transmission timing control unit 357, and outputs the determined N value to the transmission timing control unit 357.

The transmission data generation unit 356 generates data (transmission data) to be transmitted to the radio control device 200 and the radio terminal device 300 mounted on another vehicle. The transmission data includes, for example, information such as an identification number for identifying an own vehicle, vehicle speed information and vehicle position information of the own vehicle, and the like. The transmission data generation unit 356 is connected to the transmission control unit 358, and outputs the generated transmission data to the transmission control unit 358.

The transmission timing control unit 357 is connected to the control information extraction unit 352, and receives timing adjustment information output from the control information extraction unit 352. Further, the transmission timing control unit 357 includes a transmission control counter (TCC) 390. The transmission control counter 390 performs a count operation in response to the timing adjustment information. That is, since timing adjustment information is generated based on control information repeatedly transmitted from the radio control device 200 at the basic transmission period, the transmission control counter 390 performs the count operation at the intervals of the basic transmission period.

The transmission timing control unit 357 generates a transmission timing trigger signal based on a count value of the transmission control counter 390 and an N value received from the N value determination unit 392. More specifically, the transmission timing control unit 357 generates the transmission timing trigger signal at a timing when the count value of the transmission control counter 390 and the N value coincide with each other.

For example, when an N value is 1, the transmission timing control unit 357 generates one transmission timing trigger signal every time one timing adjustment information is received. That is, the transmission timing trigger signal is generated in synchronization with all the received transmission frames. Further, when an N value is 2, the transmission timing control unit 357 receives two pieces of timing adjustment information and generates one transmission timing trigger signal. That is, the transmission timing trigger signal is generated in synchronization with one transmission frame of two received transmission frames.

The transmission timing control unit 357 is connected to the transmission control unit 358, and outputs a generated transmission timing trigger signal to the transmission control unit 358.

The transmission control unit 358 is connected to the baseband unit 345, and outputs transmission data acquired from the transmission data generation unit 356 to the baseband unit 345 in synchronization with a transmission timing trigger signal output from the transmission timing control unit 357. Transmission data is modulated by the OFDM method in the baseband unit 345, and the transmission data is broadcast from the antenna 310 as a radio frequency OFDM packet signal via the transmission circuit 341.

As described above, the radio terminal device 300 performs transmission processing of transmission data at a transmission period based on a transmission timing trigger signal, which is a signal for determining a transmission timing of the transmission data. Assuming that an N value can take an integer value of 1 or more, a transmission timing trigger signal is generated at a period which is N times the basic transmission period, so the transmission data is transmitted at a transmission period which is N times the basic transmission period. Moreover, a transmission timing trigger signal is generated in synchronization with a transmission frame transmitted from the radio control device 200. Therefore, transmission data output from the transmission control unit 358 is broadcast via the communication unit 340 in synchronization with a transmission frame transmitted from the radio control device 200. In other words, the communication unit 340 of the radio terminal device 300 transmits the transmission data in synchronization with the transmission frame transmitted from the radio control device 200.

The reception control unit 359 is connected to the baseband unit 345 and the storage unit 360. The reception control unit 359 receives reception data output from the baseband unit 345, and stores the reception data in the storage unit 360. The received data here is, for example, data transmitted from the radio terminal device 300 of another vehicle, and includes an identification number for identifying another vehicle, vehicle speed information and vehicle position information of another vehicle, and the like.

Returning to FIG. 4, the description of the configuration of the radio terminal device 300 will be continued. The storage unit 360 stores the first vehicle information table, the second vehicle information table, and reception data. Like the storage unit 260 of FIG. 2, the storage unit 360 may have any configuration or type.

The interface unit 370 interfaces with a device that is external to the radio terminal device 300, such as the electronic control unit 380, the global positioning system module 381, the communication module 382, and the camera module 383. It supports interfaces of various communication protocols such as Peripheral Component Interconnect (PCI) and Serial Peripheral Interface (SPI).

The electronic control unit 380 calculates a vehicle speed of an own vehicle based on information obtained by using various sensors (not shown). The calculated vehicle speed is sent to the first vehicle information acquisition unit 353 via the interface unit 370. The global positioning system module 381 receives a global positioning system signal including position information from a global positioning system satellite (not shown). The received global positioning system signal is sent to the first vehicle information acquisition unit 353 via the interface unit 370. The communication module 382 is connected to an internet line, and can obtain various types of information such as map information (road information), congestion degree statistics information, and weather information. The obtained information is sent to the second vehicle information acquisition unit 354 via the interface unit 370. The camera module 383 acquires a captured image around an own vehicle from a camera (not shown). The obtained captured image is sent to the second vehicle information acquisition unit 354 via the interface unit 370.

In FIG. 4, the semiconductor device 330 is illustrated as including the communication unit 340, the processing unit 350, the storage unit 360, and the interface unit 370, but the configuration of the semiconductor device 360 is not limited this. Similar to the semiconductor device 230 of FIG. 2, for example, the communication unit 340, the processing unit 350, the storage unit 360, and the interface unit 370 may be formed as separate semiconductor devices. The semiconductor device 330 may be formed on one semiconductor chip or may be formed by dividing the semiconductor chip into a plurality of semiconductor chips.

Further, similarly to the semiconductor device 230 of FIG. 2, the semiconductor device 330 can be configured only by H/W or by cooperation of H/W and S/W. In other words, FIG. 4 and FIG. 5 depict functional blocks realized only by H/W, only by S/W, or by cooperation of H/W and S/W. When the semiconductor device 330 is configured only by H/W, the blocks of the semiconductor device 330 (communication unit 340, processing unit 350, storage unit 360, and interface unit 370) are configured by circuits, respectively.

When the semiconductor device 330 is configured by H/W and S/W, for example, the processing unit 350 is configured by a processor, and a function of the processing unit 350 can be realized by the processor reading and executing a predetermined program stored in the storage unit 360. The same applies to the communication unit 340, and for example, a function of the baseband unit 345 can be realized by a processor executing a program. The same applies to the semiconductor devices of the radio terminal devices in other embodiments described later.

Figure 8:
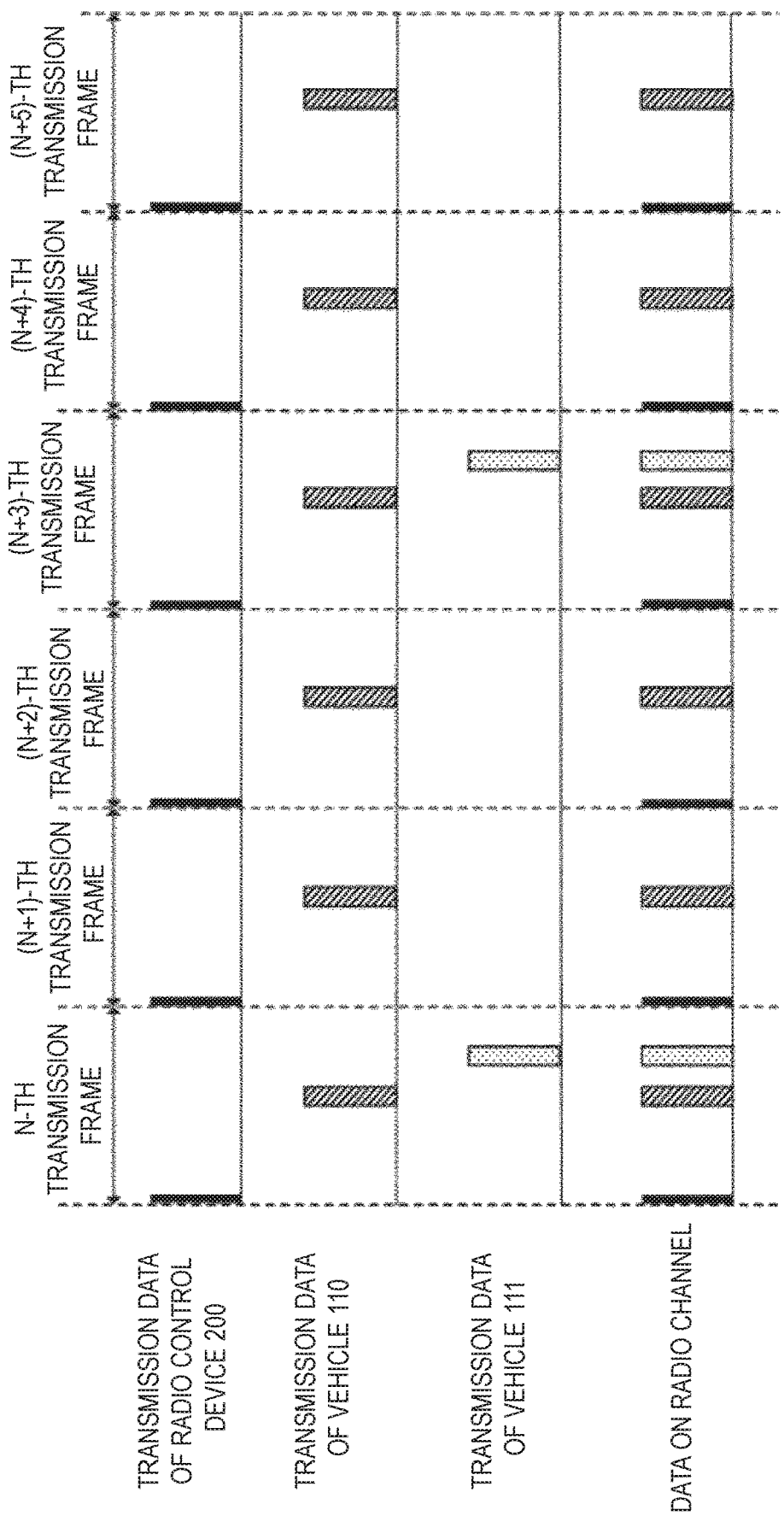
FIG. 8 is a timing chart showing an example of an operation of the communication system according to one embodiment.

Next, an example of an operation of the communication system 100 including the radio control device 200 and the radio terminal device 300 will be described. FIG. 8 is a timing chart showing the example of the operation of the communication system 100. A lateral direction of FIG. 8 corresponds to time, and six transmission frames from an n-th to (n+5)-th are shown. In a vertical direction of FIG. 8, transmission data of the radio control device 200, transmission data of the radio terminal device 300 mounted on the vehicle 110 (transmission data of vehicle 110), and transmission data of the radio terminal device 300 mounted on the vehicle 111 (transmission data of vehicle 111) are shown. The vehicle 110 and the vehicle 111 correspond to the vehicle 110 and the vehicle 111 shown in FIG. 1, respectively. It is assumed that the vehicle 110 is traveling at a speed of 40 km/h in the intersecting part 130 on the road having one lane, while the vehicle 111 is traveling toward the intersecting part 130 at a speed of 15 km/h at a distance of 15 m from the intersecting part 130 on the road having two lanes. It is also assumed that a congestion level around both vehicles is 1, and the weather around both vehicles is fine.

As shown in FIG. 8, the radio control device 200 repeatedly broadcasts a transmission frame including transmission data at a head. The transmission data transmitted from the radio control device 200 includes control information. The radio terminal device 300 mounted on the vehicle 110 and the radio terminal device 300 mounted on the vehicle 111 receive the transmission frame transmitted from the radio control device 200, and extract the control information. The radio terminal device 300 mounted on the vehicle 110 and the radio terminal device 300 mounted on the vehicle 111 broadcast transmit data at a transmission period corresponding to vehicle information in response to the received control information.

In FIG. 8, the radio terminal device 300 mounted on the vehicle 110 performs data transmission so as to include transmission data in each transmission frame. That is, the radio terminal device 300 mounted on the vehicle 110 performs data transmission at a transmission period which is 1 time the basic transmission period (transmission frame period) and which is determined based on the first vehicle information (vehicle speed: 40 km/h, vehicle position: inside the intersecting part 130 (0 m)) and the second vehicle information (number of lanes: 1, congestion degree level: 1, weather: fine) of the own vehicle.

On the other hand, the radio terminal device 300 mounted on the vehicle 111 performs data transmission at a rate of once for three transmission frames. In FIG. 8, data transmission is performed in the n-th transmission frame, and data transmission is not performed in the subsequent the (n+1)-th and the (n+2)-th transmission frames. That is, the radio terminal device 300 mounted on the vehicle 111 performs data transmission at a transmission period which is 3 times the basic transmission period (transmission frame period) determined based on the first vehicle information (vehicle speed: 15 km/h, vehicle position: 15 m) and the second vehicle information (number of lanes: 2, congestion degree level: 1, weather: fine) of the own vehicle.

As shown in FIG. 8, in the n-th and the (n+3)-th transmission frames, transmission data (control information) from the radio control device 200, transmission data from the radio terminal device 300 mounted on the vehicle 110, and transmission data from the radio terminal device 300 mounted on the vehicle 111 are included on the radio channel. In the (n+1)-th, the (n+2)-th, the (n+4)-th, and the (n+5)-th transmission frames, transmission data (control information) from the radio control device 200 and transmission data from the radio terminal device 300 mounted on the vehicle 110 are included on the radio channel. As described above, since transmission data is transmitted by being thinned out on a radio channel, a communication band corresponding to the thinned out is available for data transmission by the radio terminal device mounted on another vehicle.

Figure 9:
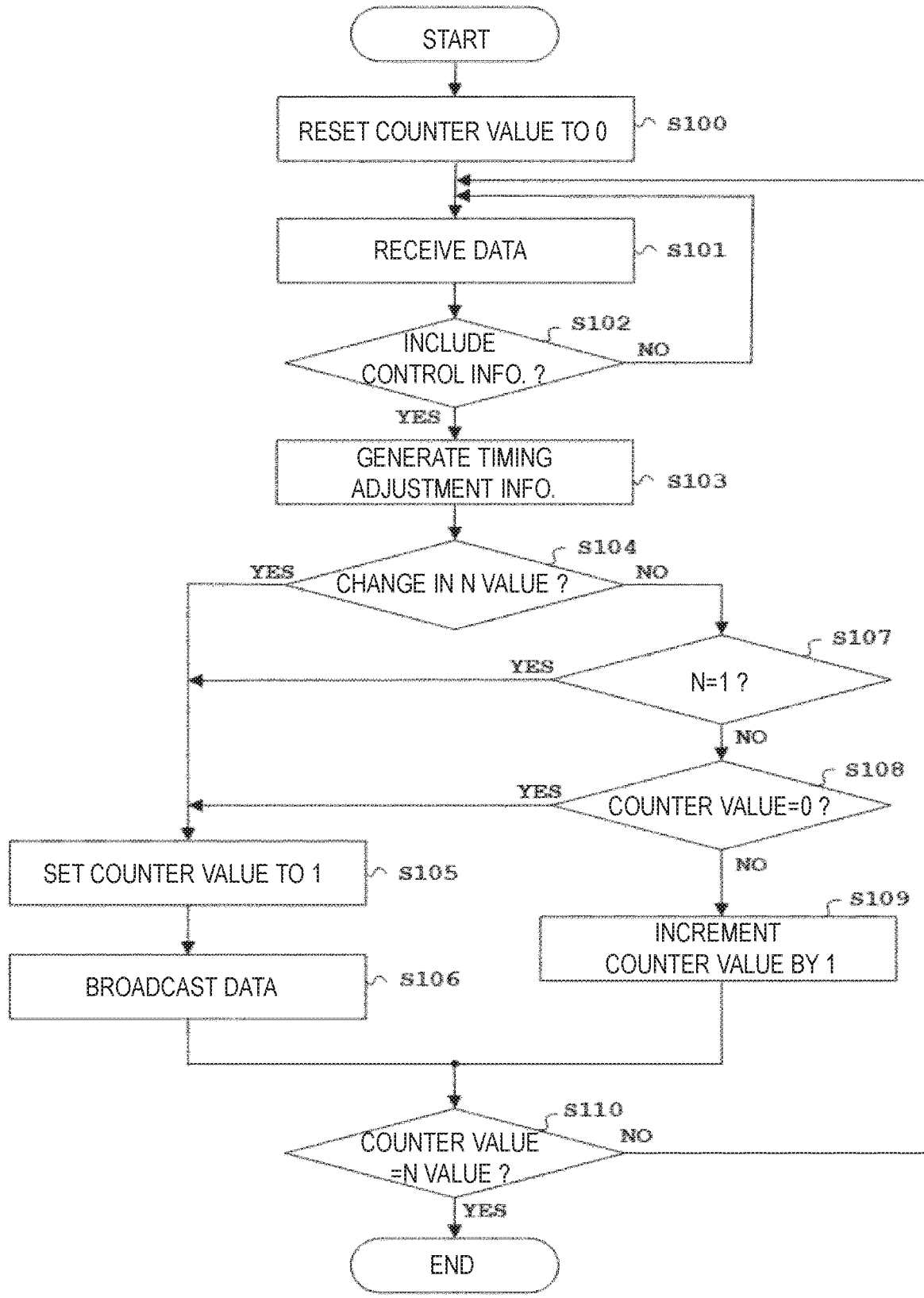
FIG. 9 is a flowchart showing an example of a procedure of transmission control of the radio terminal device according to one embodiment.

Next, referring to FIG. 9, a transmission operation of the radio terminal device 300 will be described. FIG. 9 is a flowchart showing an example of a procedure of transmission control of the radio terminal device 300. As shown in FIG. 9, first, the transmission timing control unit 357 resets a counter value of the transmission control counter 390 to 0 (step S100). The radio terminal device 300 then receives data (step S101). The received data (reception data) is sent to the control information extraction unit 352 via the communication unit 340.

The control information extraction unit 352 determines whether or not the reception data includes control information of the radio control device 200 (step S102). If it is determined that control information is included in the reception data (YES in step S102), the control information extraction unit 352 extracts the control information from the reception data, and generates timing adjustment information based on the extracted control information (step S103). On the other hand, if it is determined that the control information is not included in the reception data (NO in step S102), the radio terminal device 300 returns to the step of receiving data (step S101). And until the reception data including the control information is confirmed, the radio terminal device 300 does not proceed to the step S103 and subsequent steps.

The timing adjustment information is sent to the transmission timing control unit 357. At this time, the transmission timing control unit 357 determines whether or not there is a change in an N value output from the N value determination unit 392 (step S104). For example, the transmission timing control unit 357 holds an N value output from the N value determination unit 392 for a predetermined period, and determines whether or not the N value has changed at a timing before and after the timing adjustment information is received. When there is a change in the N value (YES in step S104), the transmission timing control unit 357 sets the counter value of the transmission control counter 390 to 1 (step S105), and outputs a transmission timing trigger signal to the transmission control unit 358. The transmission control unit 358 outputs transmission data acquired from the transmission data generation unit 356 to the communication unit 340 in synchronization with the transmission timing trigger signal output from the transmission timing control unit 357. The transmission data output to the communication unit 340 is broadcast via the radio frequency unit 320 and the antenna 310 (step S106).

On the other hand, when there is no change in the N value (NO in step S104), the transmission timing control unit 357 determines whether or not the N value is 1 (step S107). If the N value is 1 (YES in step S107), processing proceeds to the step S105 and the step S106, and transmission data is broadcast. If the N value is not 1 (NO in step S107), the transmission timing control unit 357 refers to the counter value of the transmission control counter 390, and determines whether or not the counter value is 0 (Step S108). If the counter value of the transmission control counter 390 is 0 (YES in step S108), processing proceeds to the step S105 and the step S106, and transmission data is broadcast. Moreover, if the counter value of the transmission control counter 390 is not 0 (NO in step S108), the transmission timing control unit 357 increments the counter value of the transmission control counter 390 by 1.

After the steps S106 and S109, the transmission timing control unit 357 refers to the counter value of the transmission control counter 390, and determines whether or not the counter value is an N value received from the N value determination unit 392 (step S110). If the counter value of the transmission control counter 390 is the N value (YES in step S110), a transmission operation of one transmission period in the radio terminal device 300 is completed. Moreover, if the counter value of the transmission control counter 390 is not the N value (NO in step S110), processing returns to the step S101.

As described above, the radio terminal device 300 completes the transmission operation of one transmission period by performing a series of steps from the start to the end shown in FIG. 9. During the transmission operation of one transmission period, the transmission processing of the transmission data is performed only once. Moreover, if an N value is 1 (the transmission period of the transmission data is 1 time the basic transmission period), the radio terminal device 300 receives control information once during the transmission operation of one transmission period, and completes the transmission operation. If an N value is 2 (the transmission period of the transmission data is 2 times the basic transmission period), the radio terminal device 300 receives control information twice during the transmission operation of one transmission period, and completes the transmission operation. In this case, the return from the step S110 to the step S101 is once. If an N value is 3 (the transmission period of the transmission data is three times the basic transmission period), the radio terminal device 300 receives control information three times during the transmission operation of one transmission period, and completes the transmission operation. In this case, the return from step S110 to step S101 is two times.

Figure 10:
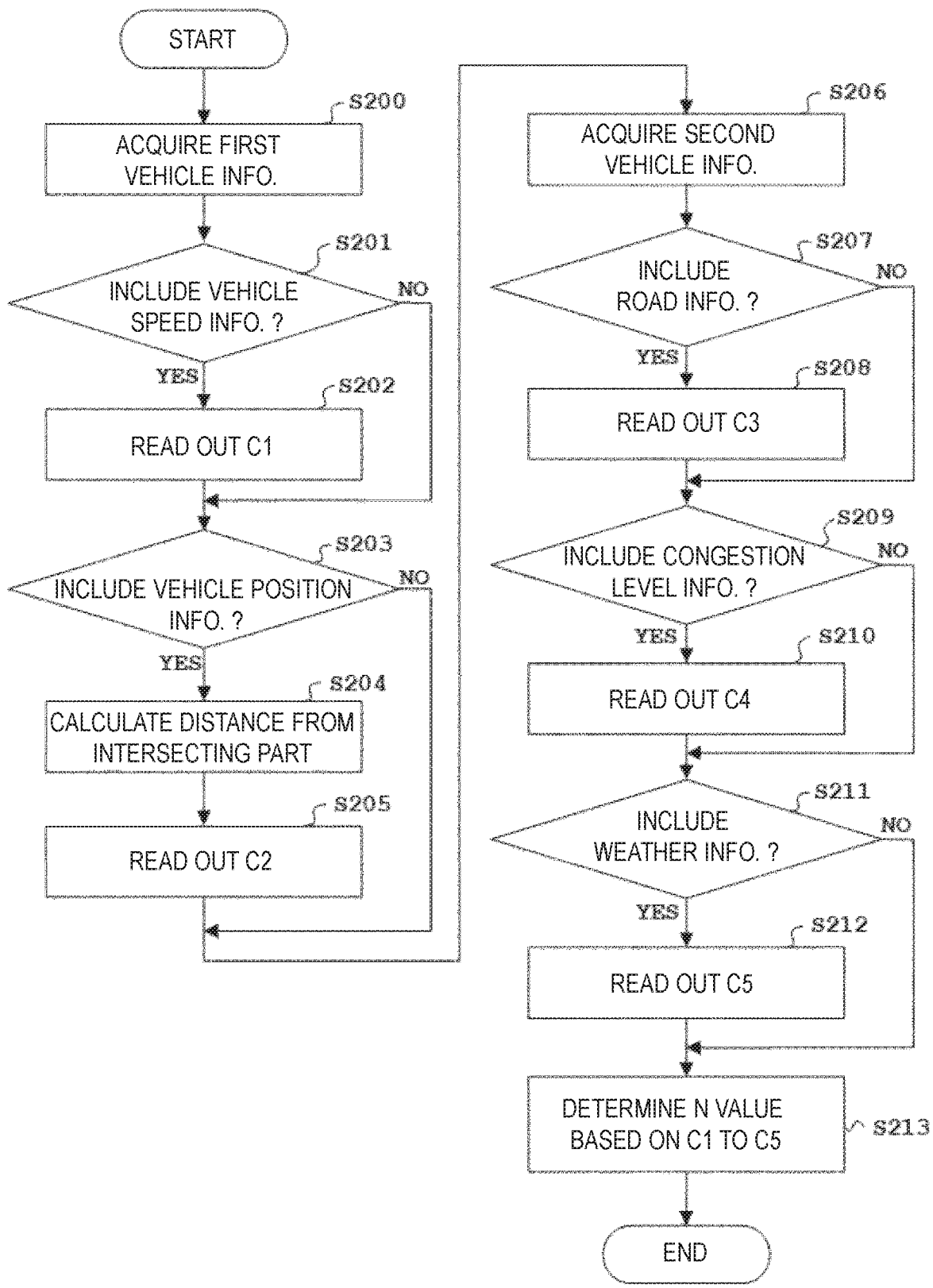
FIG. 10 is a flowchart showing an example of a procedure for determining a parameter N according to one embodiment.

Next, processing of determining an N value will be described with reference to FIG. 10. FIG. 10 is a flowchart showing an example of a procedure for determining an N value of the radio terminal device 300. As shown in FIG. 10, first, the first vehicle information acquisition unit 353 acquires first vehicle information (step S200). The acquired first vehicle information is sent to the correction value reading unit 391. The correction value reading unit 391 confirms whether or not the received first vehicle information includes vehicle speed information (step S201). If the vehicle speed information is included (YES in step S201), the correction value reading unit 391 refers to the first vehicle information table stored in the storage unit 360, and reads out a C1 corresponding to the vehicle speed information from the storage unit 360 (step S202). If the received first vehicle information does not include the vehicle speed information (NO in step S201), the step S202 is not performed.

Next, the correction value reading unit 391 confirms whether or not the received first vehicle information includes vehicle position information (step S203). If the vehicle position information is included (YES in step S203), the correction value reading unit 391 calculates a distance from the intersecting part 130 to an own vehicle on the basis of the received vehicle position information (step S204). The correction value reading unit 391 refers to the first vehicle information table stored in the storage unit 360, and reads out a C2 corresponding to the calculated distance from the storage unit 360 (step S205). If the received first vehicle information does not include the vehicle position information (NO in step S203), the step S204 and the step S205 are not performed. Information about a position of an intersection where the radio control device 200 is installed may be stored in advance in the storage unit 360, or may be acquired via the communication module 382.

Next, the second vehicle information acquisition unit 354 acquires second vehicle information (step S206). The acquired second vehicle information is sent to the correction value reading unit 391. The correction value reading unit 391 confirms whether or not the received second vehicle information includes road information (number of lanes) (step S207). When information on the number of lanes is included (YES in step S207), the correction value reading unit 391 refers to the second vehicle information table stored in the storage unit 360, and reads out a C3 corresponding to the number of lanes from the storage unit 360 (step S208). If the road information (number of lanes) is not included in the received second vehicle information (NO in step S207), the step S208 is not performed.

Next, the correction value reading unit 391 confirms whether or not the received second vehicle information includes congestion degree statistics information (congestion degree level) (step S209). If information on the congestion degree level is included (YES in step S209), the correction value reading unit 391 refers to the second vehicle information table stored in the storage unit 360, and reads out a C4 corresponding to the congestion degree level from the storage unit 360 (step S210). If the congestion degree statistics information (congestion degree level) is not included in the received second vehicle information (NO in step S209), the step S210 is not performed.

Next, the correction value reading unit 391 confirms whether or not the received second vehicle information includes weather information (step S211). If the weather information is included (YES in step S211), the correction value reading unit 391 refers to the second vehicle information table stored in the storage unit 360, and reads out a C5 corresponding to the weather information from the storage unit 360 (step S212). If the weather information is not included in the received second vehicle information (NO in step S211), the step S212 is not performed.

The C1 to C5 read by the correction value reading unit 391 are sent to the N value determination unit 392. The N value determination unit 392 determines an N value based on the C1 to C5 (step S213). The N value determination unit 392 determines the N value by setting the N value to 1 as an initial value and adding values of the C1 to C5 to it. For example, the N value determination unit 392 may determine an N value based on an equation 1.

$$N=1(\text{initial value})+C1+C2+C3+C4+C5 \quad [\text{Equation 1}]$$

In this case, the N value is determined by taking into account all the correction values read out based on the first and second vehicle information. In the case of the radio terminal device 300 mounted on the vehicle 110 and the radio terminal device 300 mounted on the vehicle 111 shown in FIG. 8, the N values are calculated using the equation 1 as follows.

[Radio Terminal Device 300 Mounted on Vehicle 110]
When the vehicle speed is 40 km/h, the C1 is 0.
When the vehicle position is 0 m, the C2 is 0.
When the number of lanes is 1, the C3 is 0.
When the congestion degree level is 1, the C4 is 0.
When the weather is fine, the C5 is 0.
Therefore, N=1+0+0+0+0=1.

[Radio Terminal Device 300 Mounted on Vehicle 111]
When the vehicle speed is 15 km/h, the C1 is 1.
When the vehicle position is 15 m, the C2 is 0.
When the number of lanes is 2, the C3 is 1.
When the congestion degree level is 1, the C4 is 0.
When the weather is fine, the C5 is 0.
Therefore, N=1+1+0+1+0+0=3.

Further, in the step S213, the N value may not be calculated in consideration of all the correction values. That is, combinations of the correction values to be considered are not limited. For example, an N value may be calculated in consideration of only first vehicle information (equation 2), may be calculated in consideration of only second vehicle information (equation 3), and may be calculated in consideration of a portion of each of first vehicle information and second vehicle information (equation 4).

$$N=1(\text{initial value})+C1+C2 \quad [\text{Equation 2}]$$

$$N=1(\text{initial value})+C3+C4+C5 \quad [\text{Equation 3}]$$

$$N=1(\text{initial value})+C1+C5 \quad [\text{Equation 4}]$$

An order of reading the C1 to C5 is not limited to the example in FIG. 10. For example, the correction value reading unit 291 may read the C3 to C5 and then read the C1 and the C2. In the calculations of the N values using the equations 1 to 4, if there is a correction value for which reading has not been performed, the N value may be calculated by setting the correction value for which the reading has not been performed to 0. Further, since the C1 to C5 associated with the vehicle information table can take integer values, the calculation results of the N values using the equations 1 to 4 can also take integer values. However, when the calculations of the equations 1, 3, and 4 are performed with reference to the first vehicle information table of FIG. 6 and the second vehicle information table of FIG. 7, the N values may become 0. Thus, when the N value becomes 0 or less, the N value can be determined as 1.

As described above, the N value determined by the N value determination unit 392 may take an integer value of 1 or more. The transmission timing control unit 357 sets a transmission period of transmission data based on an N value. In the first embodiment, when an N value is 1, a transmission period of transmission data of the radio terminal device 300 is set to 1 time the basic transmission period, when an N value is 2, a transmission period of transmission data of the radio terminal device 300 is set to 2 times the basic transmission period, and when an N value is 3, a transmission period of transmission data of the radio terminal device 300 is set to 3 times the basic transmission period.

Figure 11A:
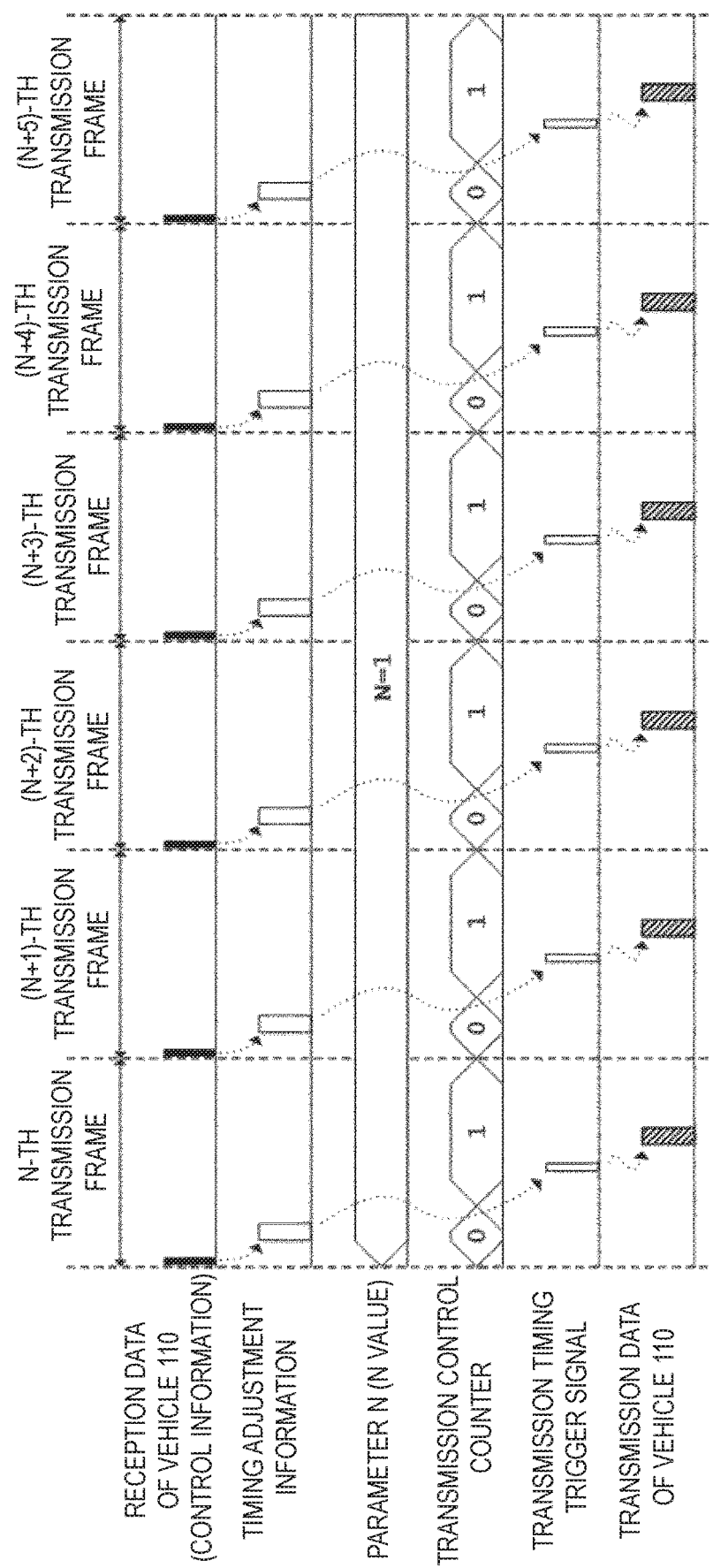
FIG. 11A is a timing chart showing an example of a transmission operation of the radio terminal device according to one embodiment.
Figure 11B:
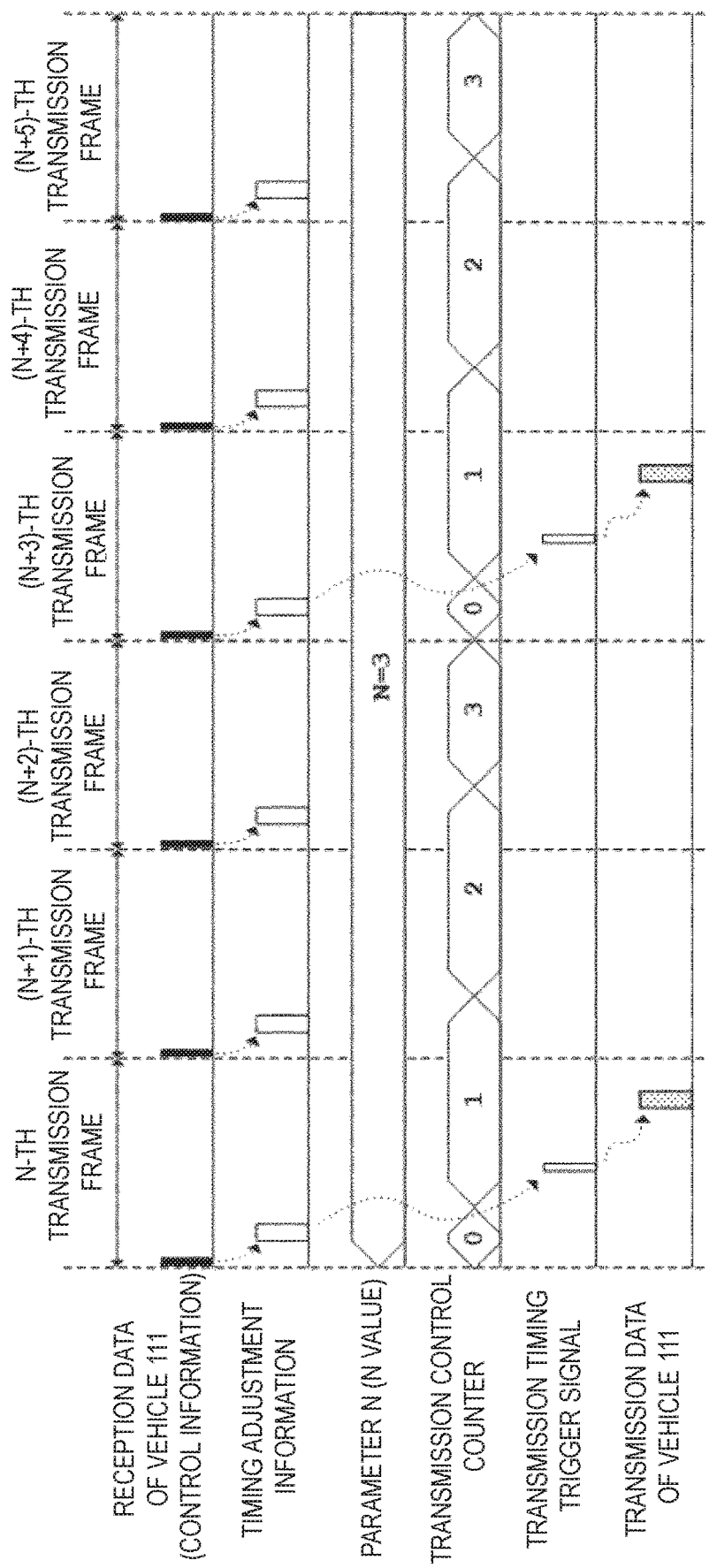
FIG. 11B is a timing chart showing an example of a transmission operation of the radio terminal device according to one embodiment.

Next, referring to FIGS. 9, 11A, and 11B, transmission operations of the radio terminal device 300 mounted on the vehicle 110 and the radio terminal device 300 mounted on the vehicle 111 will be described in detail. FIG. 11A is a timing chart showing an example of a transmission operation of the radio terminal device 300 mounted on the vehicle 110. FIG. 11B is a timing chart showing an example of a transmission operation of the radio terminal device 300 mounted on the vehicle 111. Lateral directions of FIGS. 11A and 11B corresponds to time, and six transmission frames from an n-th to (n+5)-th are shown. In vertical directions of FIGS. 11A and 11B, signals transmitted and received by the radio terminal device 300 mounted on the vehicle 110 and the radio terminal device 300 mounted on the vehicle 111 (transmission and reception data of vehicle 110 and vehicle 111) and inner signals related thereto are shown, respectively.

As shown in FIGS. 11A and 11B, the radio terminal device 300 mounted on the vehicle 110 and the radio terminal device 300 mounted on the vehicle 111 receive a transmission frame repeatedly transmitted from the radio control device 200. Control information of the radio control device 200 is included in a head portion of each transmission frame to be received. In the n-th transmission frame, the radio terminal device 300 mounted on the vehicle 110 and the radio terminal device 300 mounted on the vehicle 111 reset a counter value of the transmission control counter 390 to 0 (step S100 of FIG. 9), and then receive control information transmitted from the radio control device 200 (YES in step S101 and step S102 of FIG. 9). The control information extraction unit 352 generates timing adjustment information based on the received control information (step S103 of FIG. 9).

For the radio terminal device 300 mounted on the vehicle 110, as shown in FIG. 11A, the N value determination unit 392 determines an N value to be 1 based on first and second vehicle information of the own vehicle (vehicle 110). In the n-th transmission frame, since the transmission timing control unit 357 receives the N value from the N value determination unit 392 for the first time, the transmission timing control unit 357 determines that the N value has changed (YES in step S104 of FIG. 9), and sets the count value of the transmission control counter 390 to 1 (step S105 of FIG. 9). After that, the transmission timing control unit 357 generates a transmission timing trigger signal, and the transmission control unit 358 performs transmission processing of transmission data in synchronization with the transmission timing trigger signal (step S106 of FIG. 9). At this time, since the counter value of the transmission control counter 390 is 1 and is the same as the N value which is 1, the radio terminal device 300 mounted on the vehicle 110 completes processing of the transmission operation of one transmission period (YES in step S110 of FIG. 9). In the (n+1)-th transmission frame following the n-th transmission frame, the radio terminal device 300 mounted on the vehicle 110 enters transmission operation of the following one transmission period, and performs each of the steps S100 to S103 of FIG. 9 again. In FIG. 11A, in the periods of the n-th to (n+5)-th transmission frames, the N value is 1 and there is no change. Therefore, in the (n+1)-th transmission frame, the transmission timing control unit 357 determines that the N value is not changed (NO in step S104 of FIG. 9) and the N value is 1 (YES in step S107 of FIG. 9), and each of the steps S105, S106, and S110 of FIG. 9 are performed. By performing such a transmission operation, as shown in FIG. 11A, the radio terminal device 300 mounted on the vehicle 110 performs data transmission by setting a transmission period of transmission data to the basic transmission period.

On the other hand, with respect to the radio terminal device 300 mounted on the vehicle 111, as shown in FIG. 11B, the N value determination unit 392 determines an N value to be 3 based on first and second vehicle information of the own vehicle (vehicle 111). In the n-th transmission frame, since the transmission timing control unit 357 receives the N value from the N value determination unit 392 for the first time, the transmission timing control unit 357 determines that the N value has changed (YES in step S104 of FIG. 9), and sets the count value of the transmission control counter 390 to 1 (step S105 of FIG. 9). After that, the transmission timing control unit 357 generates a transmission timing trigger signal, and the transmission control unit 358 performs transmission processing of transmission data in synchronization with the transmission timing trigger signal (step S106 of FIG. 9). At this time, since the counter value of the transmission control counter 390 is 1 and differs from the N value which is 3 (NO in step S110 of FIG. 9), the radio terminal device 300 mounted on the vehicle 111 returns to state of receiving data in the (n+1)-th transmission frame (step S101 of FIG. 9). When control information is received in the (n+1)-th transmission frame, the control information extraction unit 352 generates timing adjustment information. In FIG. 11B, in the periods of the n-th to (n+5)-th transmission frames, the N value is 3 and there is no change. Therefore, the transmission timing control unit 357 determines that the N value is not changed (NO in step S104 of FIG. 9), the N value is not 1 (NO in step S107 of FIG. 9), and the count value of the transmission control counter 390 is not 0 (NO in step S108 of FIG. 9), and increments the counter value of the transmission control counter 390 by 1. At this time, since the counter value of the transmission control counter 390 is 2 and differs from the N value which is 3 (NO in step S110 of FIG. 9), the radio terminal device 300 mounted on the vehicle 111 returns to the state of receiving data in the (n+2)-th transmission frame (step S101 of FIG. 9). Similar to the (n+1)-th transmission frame, the transmission operation is performed in the (n+2)-th transmission frame. However, since the counter value of the transmission control counter 390 in the (n+2)-th transmission frame is 3 (YES in step S110 of FIG. 9), the radio terminal device 300 mounted on the vehicle 111 completes the processing of the transmission operation in one transmission period. By performing such a transmission operation, as shown in FIG. 11B, the radio terminal device 300 mounted on the vehicle 111 performs data transmission by setting a transmission period of transmission data to three times the basic transmission period.

As described above, the transmission and reception control unit 351 of the radio terminal device 300 can operate by switching, based on an N value (transmission period), between a first transmission operation mode (in the case of FIG. 11A) for controlling a transmission timing of transmission data so as to output the transmission data to the communication unit each time a transmission frame is received, and a second operation mode (in the case of FIG. 11B) for controlling a transmission timing of transmission data so as to include a case where transmission data is output to the communication unit in response to a received transmission frame and a case where transmission data is not output to the communication unit in response to a received transmission frame.

Further, in the communication system 100 according to the first embodiment, a Carrier Sense Multiple Access/Collision Detection (CSMA/CD) method is adopted for radio channel access control. In this method, an Inter Frame Space (IFS) for defining a waiting time immediately after a radio channel is released from a busy state and a Contention Window (CW) for defining a maximum value of a random back-off period following the IFS are set. Values of the IFS and the CW are set so as to differ from each other between the radio terminal devices 300. That is, different values of the IFS and the CW are set to the radio terminal device 300 mounted on the vehicle 110 and the radio terminal device 300 mounted on the vehicle 111, respectively. As a result, as shown in the n-th and the (n+3)-th transmission frames of FIG. 8, the radio terminal device 300 mounted on the vehicle 110 and the radio terminal device 300 mounted on the vehicle 111 transmit transmission data so as to shift transmission timings of each other on the same radio channel to avoid collisions of the transmission data.

According to the first embodiment, the radio terminal device 300 mounted on each vehicle can change a transmission period of transmission data based on vehicle information of an own vehicle, that is, one or both of first vehicle information and second vehicle information. For example, in the examples shown in FIGS. 8 and 11, the transmission period of the transmission data of the radio terminal device 300 mounted on the vehicle 110 is set to be ⅓ of the transmission period of the transmission data of the radio terminal device 300 mounted on the vehicle 111. That is, a transmission frequency of the transmission data (frequency of information transmission) of the radio terminal device 300 mounted on the vehicle 110 is set to be higher than the that of the transmission data of the radio terminal device 300 mounted on the vehicle 111. The vehicle 110 on which the radio terminal device 300 is mounted is traveling on the road having one lane at the speed of 40 km/h and is located in the intersecting part 130. That is, the vehicle 110 is traveling at a relatively high speed in an intersection where a lane width is narrow and a risk of occurrence of a traffic accident is high, and priority of information transmission of the vehicle 110 is high from a viewpoint of preventing a traffic accident. On the other hand, the vehicle 111 on which the radio terminal device 300 is mounted is traveling on the road having two lanes at a speed of 15 km/h, and the vehicle 111 is 15 m from the intersecting part 130. Although the vehicle 111 is traveling at a position relatively close to the intersection, priority of information transmission of the vehicle 111 is lower than that of the vehicle 110 in terms of the number of lanes and the vehicle speed.

At a location where many vehicles are concentrated, such as at an intersection, bands of a radio channel may be filled completely. At this time, if communication of a vehicle traveling at a high speed or a vehicle traveling in a location close to an intersection is hindered, it is particularly problematic. However, according to the first embodiment, the radio terminal device 300 mounted on each vehicle can perform data transmission in which the priorities of information transmission are adjusted based on vehicle information such as a vehicle speed information and a vehicle position information. As a result, even in a place where many vehicles gather, it is possible to reduce a situation in which communication of a vehicle having a high priority of information transmission is hindered.

For example, it is assumed that the radio control device 200 can communicate with vehicles (radio terminal devices 300) existing within a radius of 250 m centering on a place where the radio control device 200 is installed, and that an area within a circle having the radius of 250 m may include up to 500 vehicles during morning commute rush hour. At this time, if it is assumed that one period of a transmission frame transmitted from the radio control device 200 is 100 ms and a length of one transmission data transmitted from the radio terminal device 300 of each vehicle is 0.5 ms, the bands on the radio channel are completely filled by data transmission from the 200 radio terminals devices 300 (however, for simplification, a transmission period for control information transmitted from the radio control device 200 is not considered). If a vehicle having a high priority of information transmission is included in the remaining 300 vehicles, information transmission from the vehicle cannot be performed. However, according to the first embodiment, by suppressing a rate of data transmission from the radio terminal device 300 which may have a low priority of information transmission (frequency of updating information), data transmission from the radio terminal device 300 which has a high priority of information transmission can be prioritized.

In the first embodiment, the radio control device 200 may include information on a location of an intersection where the radio control device 200 is installed in control information. In this case, the control information extraction unit 352 extracts the position information of the intersection from the control information, and the correction value reading unit 391 can calculate a distance from the intersecting part 130 to the own vehicle using the extracted position information of the intersection and the position information of the own vehicle acquired from the first vehicle information acquisition unit 353.

The vehicle information table shown in FIGS. 6 and 7 is an example, and each item such as the vehicle speed and the vehicle position, and the magnitude of the correction value for each item are not limited to those exemplified. For example, other items related to first vehicle information include acceleration of a vehicle (opening degree of an accelerator pedal, state of a brake), state of a vehicle (state of lights), direction of a vehicle (steering wheel angle), and characteristics of a vehicle (shape, size and weight of a vehicle body, vehicle type, and application of a vehicle). Other items related to second vehicle information include a shape of a road (straight line/curve, road width, gradient) and the number of past traffic accidents. Further, for example, for a road having a narrow road width, the correction value of the vehicle information table may be adjusted to have a large value as a whole.

Further, according to the weather information of the second vehicle information table shown in FIG. 7, since the correction value is set to a negative value in the case of rainy/snowy/foggy, a communication frequency of the radio terminal device 300 in the case of rainy/snowy/foggy is set to an increasing direction. This rather works in a direction of worsening a radio communication environment in a place where many vehicles gather. However, in view of a risk that communication of a vehicle having a high priority of information transmission is hindered by influence of the weather, there is a great advantage in that the communication frequency is increased in the case of rainy/snowy/foggy.

Second Embodiment

Figure 12:
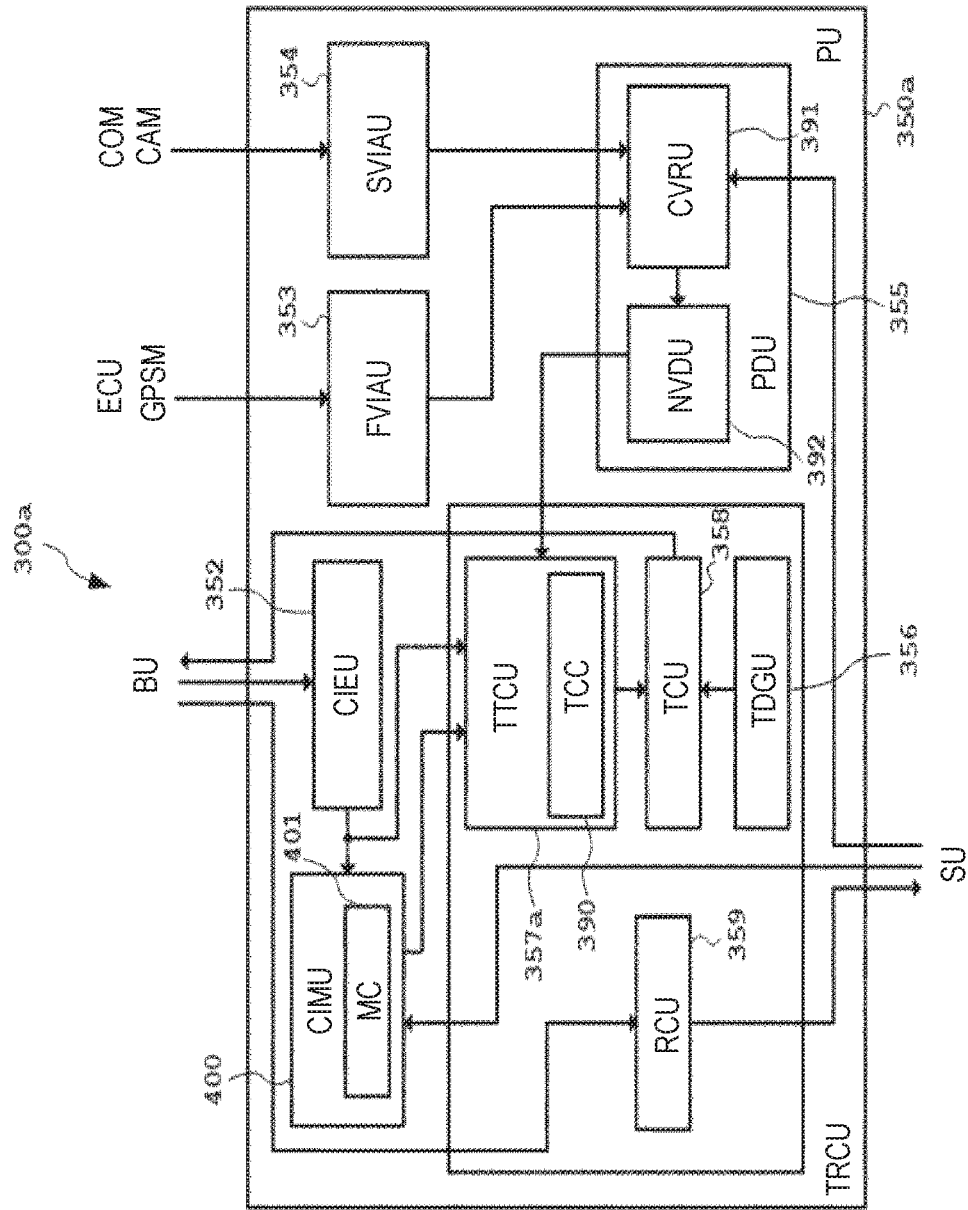
FIG. 12 is a block diagram showing an example of a configuration of a processing unit according to one embodiment.

Next, a second embodiment will be described. In the second embodiment, a processing unit 350a which is another embodiment of the processing unit 350 according to the first embodiment will be described. FIG. 12 is a block diagram showing an example of a configuration of the processing unit (PU) 350a included in a radio terminal device 300a according to the second embodiment. In the second embodiment, configurations of the radio terminal device 300a other than the processing unit 350a may be the same as those shown in FIG. 4. Therefore, their descriptions are omitted here. Further, components of the processing unit 350a described in FIG. 12 having the same functions as those of the processing unit 350 described in FIG. 5 are denoted by the same reference numerals, and the descriptions thereof are omitted.

As shown in FIG. 12, the processing unit 350a includes a control information monitoring unit (CIMU) 400 in addition to the configuration shown in FIG. 5. The control information monitoring unit 400 is connected to the control information extraction unit 352, the storage unit 360, and the transmission timing control unit (TTCU) 357a. The storage unit 360 stores information on a monitoring time. For example, it is assumed that the monitoring time is larger than a period (basic transmission period) of a transmission frame transmitted by the radio control device 200.

Figure 13:
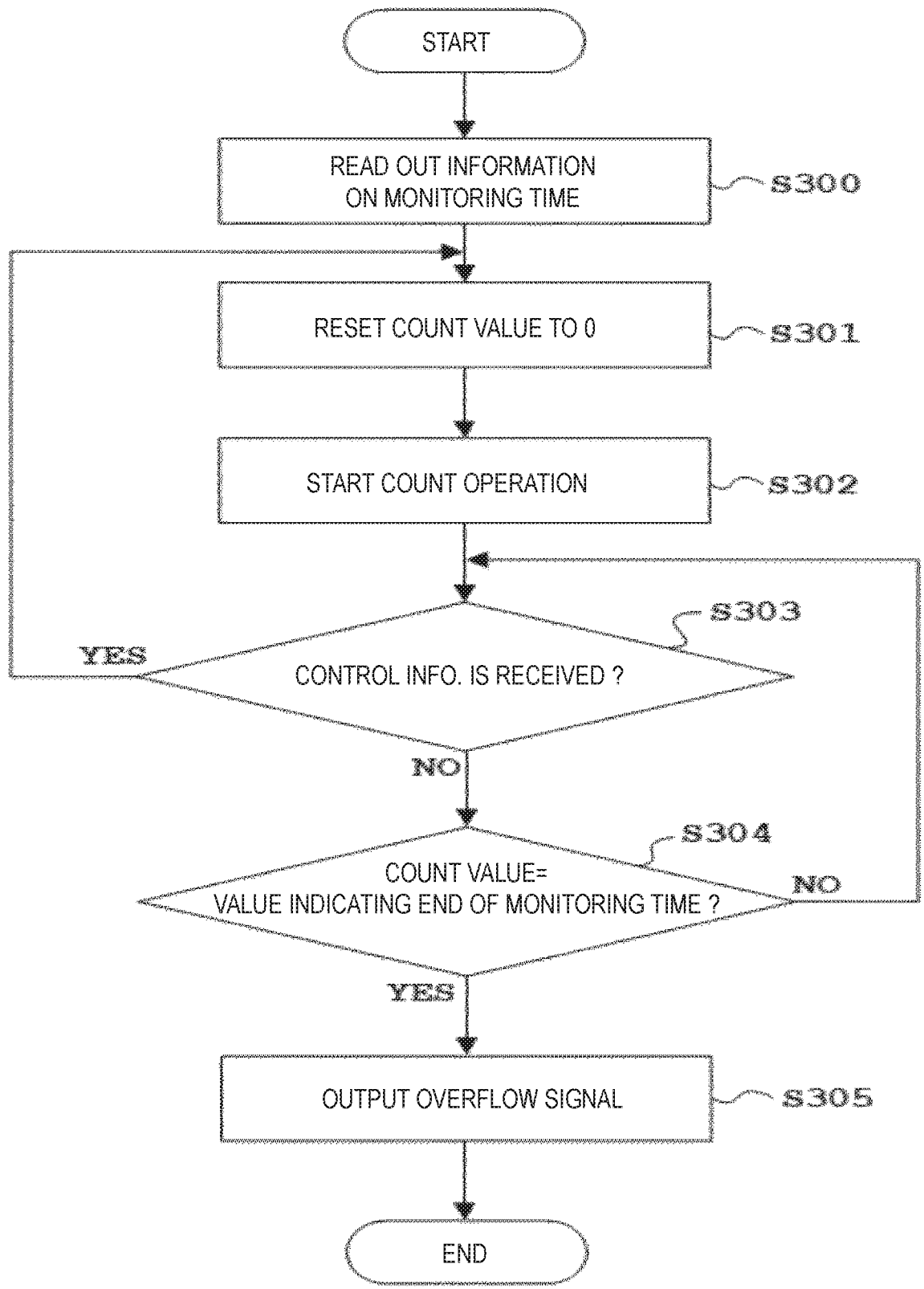
FIG. 13 is a flowchart showing an example of a count operation of a monitor counter according to one embodiment.

The control information monitoring unit 400 includes a monitoring counter (MC) 401, and confirms whether or not control information is received while measuring the monitoring time using the monitoring counter 401. An operation of the monitoring counter 401 will be described in detail here. FIG. 13 is a flowchart showing an example of a count operation of the monitoring counter 401. As shown in FIG. 13, first, the control information monitoring unit 400 reads out information on the monitoring time from the storage unit 360 (step S300). Next, the control information monitoring unit 400 resets a count value of the monitoring counter 401 to 0 (step S301). Thereafter, the control information monitoring unit 400 causes the monitoring counter 401 to start the count operation (step S302).

While the monitoring counter 401 continues the count operation, the control information monitoring unit 400 determines whether or not control information is received based on timing adjustment information output from the control information extraction unit 352 (step S303). If it is determined that control information is received (YES in step S303), processing returns to the step S301, and the step S301 and the step S302 are performed again. If it is not determined that control information is received (NO in step S303), the control information monitoring unit 400 refers to the count value of the monitoring counter 401, and determines whether or not the count value of the monitoring counter 401 has reached a value indicating an end of the monitoring time (step S304). When it is determined that the counter value of the monitoring counter 401 has reached the value indicating the end of the monitoring time (YES in Step S304), the control information monitoring unit 400 outputs an overflow signal (Step S305). If it is not determined that the count value of the monitoring counter 401 has reached the value indicating the end of the monitoring time (NO in step S304), processing returns to the step S303, and the count operation of the monitoring counter 401 is continued. After the overflow signal is output, the operation of the monitoring counter 401 is repeated from the beginning of the flowchart of FIG. 13. However, in the second and subsequent times, the step S300 may be omitted as long as there is no change in the monitoring time.

Figure 14:
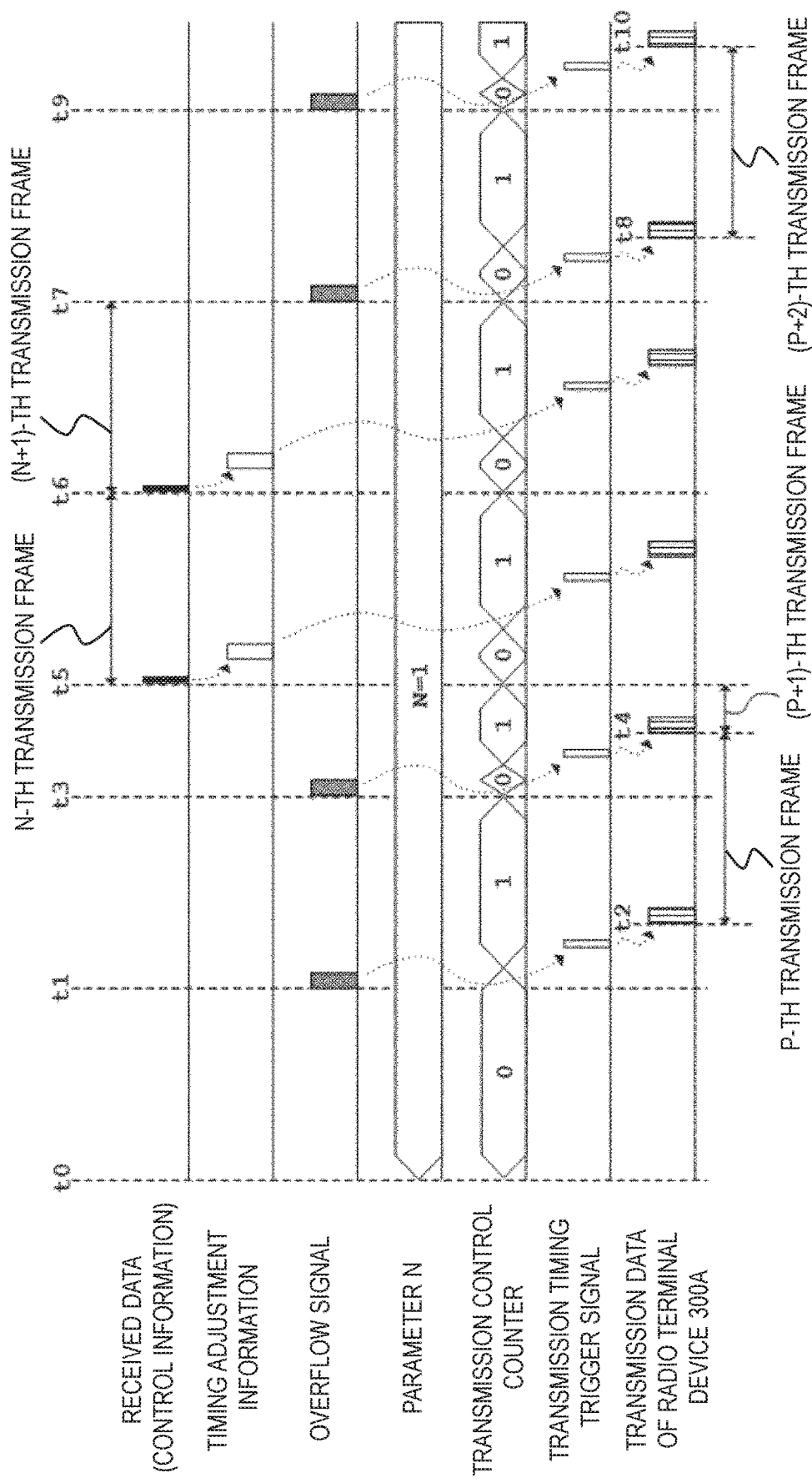
FIG. 14 is a timing chart showing an example of a transmission operation of a radio terminal device according to one embodiment.

Next, referring to FIGS. 13 and 14, a transmission operation of the radio terminal device 300a mounted on a vehicle (not shown in FIG. 1) will be described. FIG. 14 is a timing chart showing an example of the transmission operation of the radio terminal device 300a. A lateral direction in FIG. 14 corresponds to time. In a vertical direction of FIG. 14, signals transmitted and received by the radio terminal device 300a, and inner signals associated therewith are shown, respectively.

It is assumed that a shield (not shown) exists between a vehicle (not shown) and the traffic signal 120 in which the radio control device 200 in FIG. 1 is installed, and the radio terminal device 300a is in a situation where it is difficult to receive a transmission frame (control information) from the radio control device 200. Therefore, as shown in FIG. 14, the radio terminal device 300a mounted on the vehicle 112 cannot receive control information at timings other than timings t5 and t6. Further, as shown in FIG. 14, the N value determination unit 392 determines an N value to be 1 based on an acquired first or second vehicle information.

At a timing t0 in FIG. 14, the control information monitoring unit 400 resets a count value of the monitoring counter 401 to 0, then causes the monitoring counter 401 to start a count operation, and starts measurement of the monitoring time read out from the storage unit 360 (steps S300 to S302 of FIG. 13). Since reception of control information from the radio control device 200 could not be confirmed by the time when the monitoring counter 401 completes the measurement of the monitoring time (NO in step S303 of FIG. 13), the control information monitoring unit 400 outputs an overflow signal to the transmission timing control unit 357a (step S305 of FIG. 13) at a timing t1 when the monitoring counter 401 completes the measurement of the monitoring time (YES in step S304 of FIG. 13).

The transmission timing control unit 357 according to the first embodiment generates a transmission timing trigger signal based on timing adjusting information output from the control information extraction unit 352. On the other hand, the transmission timing control unit 357a according to the second embodiment generates a transmission timing trigger signal based on an overflow signal output from the control information monitoring unit 400 in addition to timing adjusting information output from the control information extraction unit 352. Similar to the radio terminal device 300 according to the first embodiment, the terminal device 300a according to the second embodiment also performs transmission processing of transmission data at a timing t2 in synchronization with the transmission timing trigger signal.

After an overflow signal is output again at a timing t3 in FIG. 14 and transmission processing of transmission data is performed at a timing t4, the radio terminal device 300a receives control information transmitted from the radio control device 200 at a timing t5. Since the control information is received (NO in step S303 of FIG. 13), the control information monitoring unit 400 resets the count value of the monitoring counter 401 to 0, and causes the monitoring counter 401 to restart the count operation again from the beginning (step S301 and step S302 of FIG. 13). When the control information is received, the same processing as the transmission processing of the radio terminal device 300 according to the first embodiment is performed in the radio terminal device 300a according to the second embodiment.

In the case shown in FIG. 14, the radio terminal device 300a can receive control information for the second time at a timing t6, but cannot receive control information thereafter. Therefore, an overflow signal is output again at a timing t7 by a measurement operation of the monitoring time of the monitoring counter 401, and the radio terminal device 300a performs transmission processing of transmission data based on the overflow signal at a timing t8.

According to the second embodiment, the radio terminal device 300a can perform transmission processing of transmission data even when a transmission frame (control information) transmitted from the radio control device 200 cannot be received. In this instance, since the radio terminal device 300a performs the transmission processing without synchronizing with the transmission frame transmitted from the radio control device 200, the radio terminal device 300a itself is configured to transmit transmission frame independently. In FIG. 14, a period from the timing t2 to the timing t5 and a period after the timing t8 are periods in which the radio terminal device 300a transmits the transmission frames (p-th to (p+2)-th transmission frames). On the other hand, when a transmission frame (control information) transmitted from the radio control device 200 can be received, the radio terminal device 300a performs transmission processing in synchronized with an n-th and (n+1)-th transmission frames transmitted from the radio control device 200.

As described above, the radio terminal device 300*a* according to the second embodiment can perform a transmission operation by switching between a third transmission operation mode in which transmission processing is performed on the basis of an overflow signal and a fourth transmission operation mode in which transmission processing is performed on the basis of control information transmitted from the radio control device 200.

In the above explanation of the second embodiment, an operation of monitoring reception of control information and an operation of transmitting transmission data are commonly controlled based on the monitoring counter 401. However, they can also be controlled separately. For example, a counter for controlling the operation of transmitting the transmission data may be provided separately from the monitoring counter 401. In this case, if the newly installed counter is set to measure a time different from the monitoring time, the transmission data can be transmitted at a period different from the monitoring time.

Third Embodiment

Figure 15:
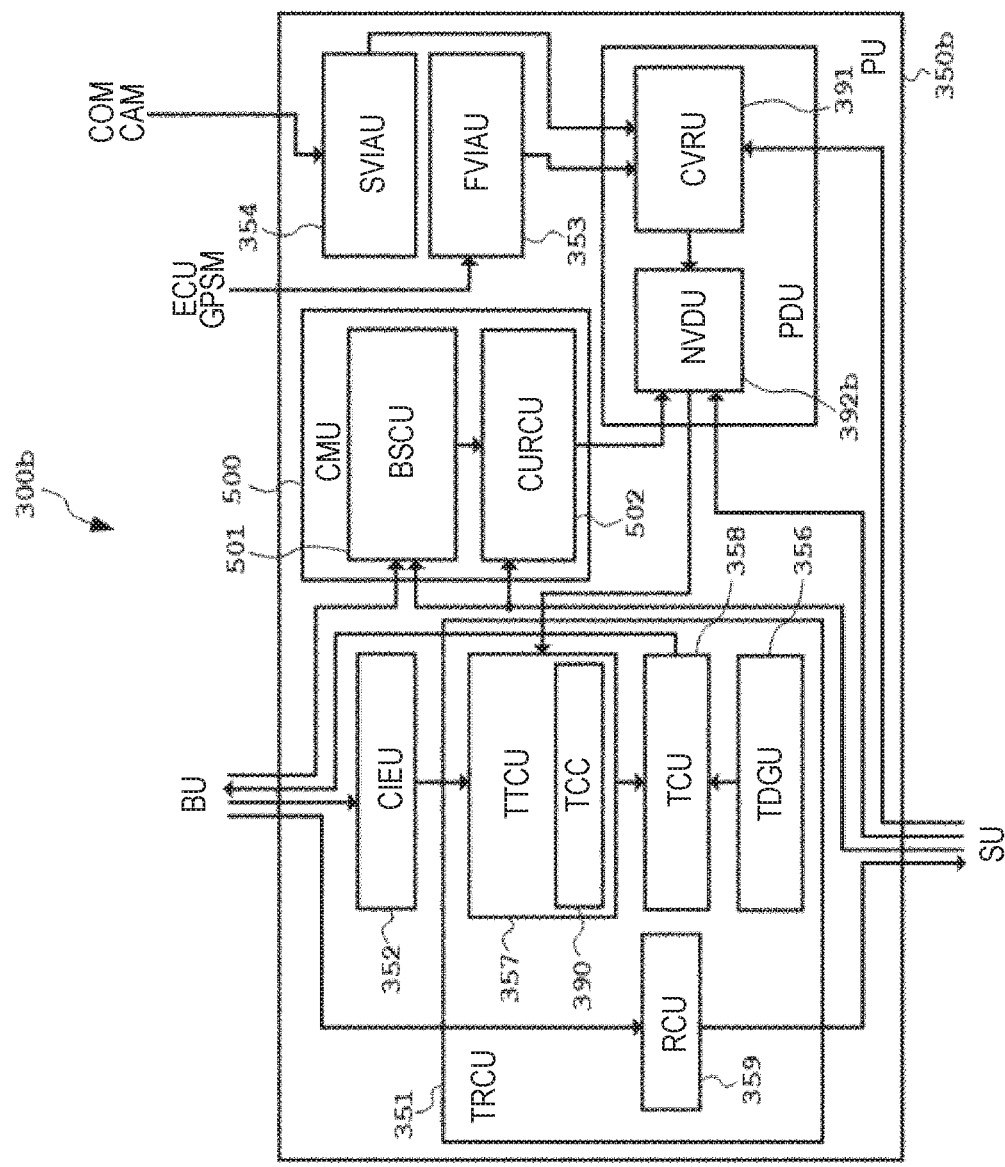
FIG. 15 is a block diagram showing an example of a configuration of a processing unit according to one embodiment.

Next, a third embodiment will be described. In the third embodiment, a processing unit 350*b* which is still another embodiment of the processing unit 350 according to the first embodiment will be described. FIG. 15 is a block diagram showing an example of a configuration of the processing unit (PU) 350*b* included in a radio terminal device 300*b* according to the third embodiment. In the third embodiment, configurations of the radio terminal device 300*b* other than the processing unit 350*b* may be the same as those shown in FIG. 4. Therefore, their descriptions are omitted here. Further, components of the processing unit 350*b* described in FIG. 15 having the same functions as those of the processing unit 350 described in FIG. 5 are denoted by the same reference numerals, and the descriptions thereof are omitted.

As shown in FIG. 15, the processing unit 350*b* includes a channel monitoring unit (CMU) 500 in addition to the configuration shown in FIG. 5. The channel monitoring unit 500 includes a busy state count unit (BSCU) 501 and a channel use rate calculation unit (CURCU) 502. The busy state count unit 501 is connected to the baseband unit 345, receives received data from the baseband unit 345, and generates a signal (busy signal) indicating a use state of a radio channel. For example, the busy signal is generated by setting a period in which data transmitted from the radio control device 200 and the radio terminal device 300 mounted on another vehicle is received to a high level (activated state) and setting a period in which the data is not received to a low level (deactivated state). The busy signal may be generated by the communication unit 340. The busy state count unit 501 is connected to the storage unit 360, and reads information on a unit time stored in the storage unit 360. The busy state count unit 501 measures a period during which the busy signal becomes the high level within the unit time read from the storage unit 360. The busy state count unit 501 is connected to the channel use rate calculation unit 502, and outputs a time value of a busy state obtained by the measuring to the channel use rate calculation unit 502.

The channel use rate calculation unit 502 is connected to the storage unit 360, and reads the information on the unit time stored in the storage unit 360. The channel use rate calculation unit 502 calculates a channel use rate by dividing the time value of the busy state received from the busy state count unit 501 by the unit time read out from the storage unit 360. Moreover, the channel use rate calculation unit 502 is connected to the N value determination unit (NVDU) 392*b*, and outputs the calculated channel use rate to the N value determination unit 392*b*.

The N value determination unit 392*b* according to the third embodiment determines an N value based on a C1 to C5 using the same method as the determination method by the N value determination unit 392 according to the first embodiment. However, the N value determination unit 392*b* according to the third embodiment differs from the N value determining unit 392 according to the first embodiment in that the N value determined on the basis of the C1 to C5 is adjusted on the basis of the channel use rate.

The N value determination unit 392*b* is connected to the storage unit 360, and reads a first threshold value (R1) and a second threshold value (R2) stored in the storage unit 360. The R1 and the R2 are in a relationship R1<R2. The N value determination unit 392*b* compares the channel use rate received from the channel use rate calculation unit 502 with the R1 and the R2 read out from the storage unit 360 to determine a congestion degree of transmission data on the radio channel, and adjusts the N value based on the determined result.

Figure 16:
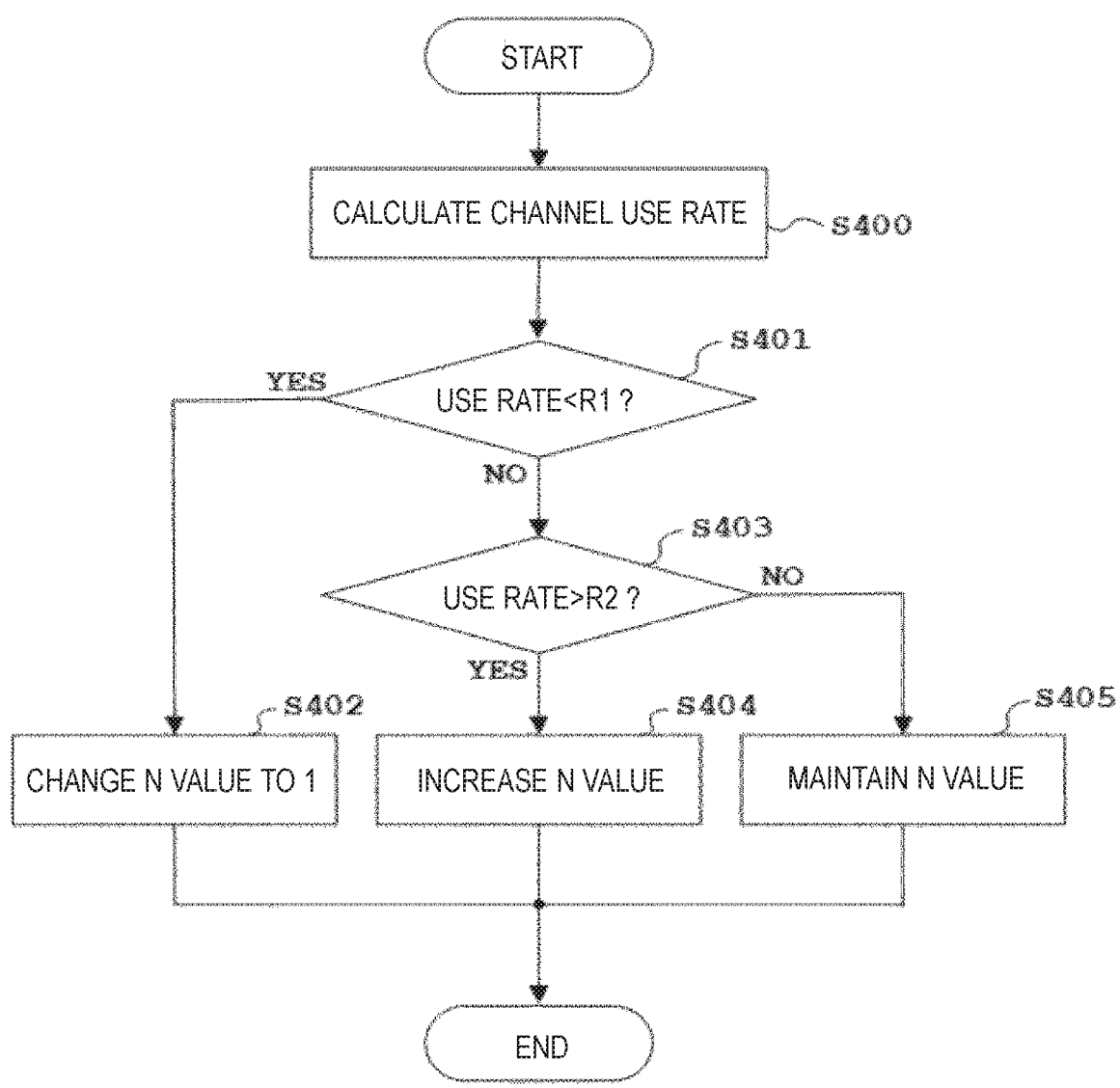
FIG. 16 is a flowchart showing an example of a procedure for adjusting the parameter N according to one embodiment.

FIG. 16 is a flowchart showing an example of a procedure for adjusting an N value based on a channel use rate. First, the channel use rate calculation unit 502 calculates a channel use rate per a unit time based on a time value of a busy state output from the busy state count unit 501 (step S400). The N value determination unit 392*b* determines whether or not the calculated channel use rate is smaller than the R1 (step S401). If the channel use rate is smaller than the R1 (YES in step S401), the N value determination unit 392*b* determines that the radio channel is idle, and changes the N value to 1 (step S402). That is, regardless of values of a C1 to C5 (vehicle information of an own vehicle), the N value is changed to 1, and a transmission period of transmission data is set to a period (basic transmission period) of a transmission frame of the radio control device 200. In this instance, Since the number of vehicles (radio terminal devices 300) that perform radio communication around the own vehicle is small and a band for performing radio communication is sufficiently secured, it is determined that frequency of radio communication need not be reduced by increasing the transmission period of the transmission data.

If the channel use rate is not smaller than the R1 (NO in step S401), the N value determination unit 392*b* determines whether or not the channel use rate is larger than the R2 (step S403). If the channel use rate is larger than the R2 (YES in step S403), the N value determination unit 392*b* determines that the radio channel is in a congested state, and increases the N value determined based on the C1 to C5 (vehicle information of the own vehicle) (step S404). That is, since the N value is changed to be large, a transmission period of transmission data is set to be large. In this instance, since the number of vehicles (radio terminal devices 300) that perform radio communication around the own vehicle is large and a band for performing radio communication is not sufficiently secured, it is determined that a congestion degree of radio communication needs to be alleviated by increasing the transmission period of the transmission data. Note that in the step S404, instead of increasing the N value determined based on the C1 to C5, any one of the C1 to C5 may be increased.

When the channel use rate is not larger than the R2 (NO in step S403), the N value determination 392*b* maintains the N value determined based on the C1 to C5 (vehicle information of the own vehicle) (step S405). In this case, it is determined that it is unnecessary to change the current method of determining the transmission period of the transmission data in consideration the degree of the channel congestion.

As described above, the radio terminal device 300b can perform a transmission operation by switching, in accordance with results of comparing a channel use rate with the R1 and the R2, between a fifth transmission operation mode (step S402) in which an N value is fixed to 1 and a transmission period of transmission data is not changed (not changed from the basic transmission period) and a sixth transmission operation mode (steps S404 and S405) in which a transmission period of transmission data is changed based on an N value.

According to the third embodiment, the radio terminal device 300b adjusts transmission period of transmission data by monitoring a use state of a radio channel so that data can be transmitted at an appropriate frequency. Therefore, in a situation where a sufficient band for radio communication is secured, it is possible to avoid unnecessarily decreasing an opportunity for radio communication by increasing the transmission period of the transmission data. On the other hand, in a situation where there is no margin in a band of radio communication, it is possible to avoid a situation in which the radio communication cannot be performed due to the band on the radio channel being filled by further increasing the transmission period of the transmission data.

Although FIG. 16 shows the steps (steps S401 and S403) of comparing a channel use rate with both the R1 and the R2, the channel use rate may be compared with one of the R1 and the R2. For example, if it is not determined in the step S401 that the channel use rate is smaller than the R1, the subsequent processing proceeds to the step S405. Thereby, it can be changed so that the channel use rate is compared with the R1 only. Also, by omitting the step S401, it can be changed so that the channel use rate is compared with the R2 only.

Modification of Third Embodiment

Figure 17:
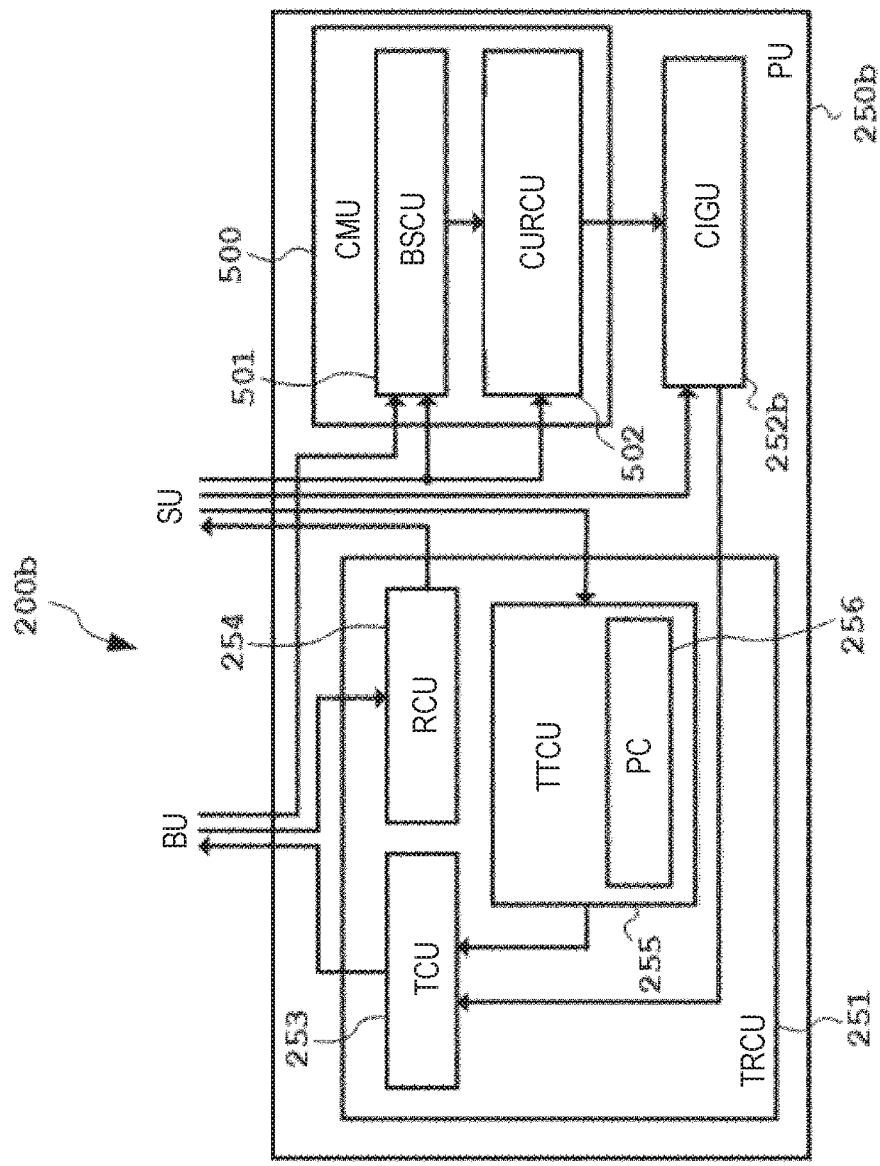
FIG. 17 is a block diagram showing an example of a configuration of a processing unit according to a modification of one embodiment.

Next, a modification of the third embodiment will be described. In the above described third embodiment, a channel use rate is calculated by the radio terminal device 300b, but calculation processing of the channel use rate can also be performed by the radio control device 200. FIG. 17 is a block diagram showing an example of a configuration of a processing unit (PU) 250b included in a radio control device 200b according to the modification of the third embodiment. In the modification of the third embodiment, configurations of the radio control device 200b other than the processing unit 250b may be the same as those shown in FIG. 2. Therefore, their descriptions are omitted here. Further, components of the processing unit 250b described in FIG. 17 having the same functions as those of the processing unit 250 described in FIG. 3 are denoted by the same reference numerals, and the description thereof are omitted.

As shown in FIG. 17, the processing unit 250b includes a channel monitoring unit 500 in addition to the configuration shown in FIG. 3. The channel monitoring unit 500 of the processing unit 250b has the same function as the channel monitoring unit 500 of the processing unit 350b of FIG. 15. In FIG. 17, a channel use rate calculation unit 502 is connected to the control information generation unit (CIGU) 252b, and outputs a calculated channel use rate to the control information generation unit 252b. The control information generation unit 252b generates control information including the channel use rate received from the channel use rate calculation unit 502. The control information including the channel use rate is broadcast via the transmission control unit 253.

The control information including the channel use rate transmitted from the radio control device 200b is received by the radio terminal device 300b. The received channel use rate may be extracted from the control information by the control information extraction unit 352 and sent to the N value determination unit 392b, for example. If calculation processing of a channel use rate is constantly performed by the radio control device 200b, the radio terminal device 300b may not include the channel monitoring unit 500.

In FIG. 17, the radio control device 200b calculates a channel use rate, and transmits the channel use rate to the radio terminal device 300b by including the calculated channel use rate in control information. However, the radio control device 200b may compare the channel use rate with the R1 and the R2, and may include results of the comparison in control information and transmit the control information to the radio terminal device 300b. In this instance, the N value determination unit 392b of the radio terminal device 300b can adjust an N value determined by a C1 to C5 based on the results of the comparison received from the radio control device 200b.

Fourth Embodiment

Next, a fourth embodiment will be described. Japanese unexamined Patent Application publication No. 2010-124330 discloses a communication system that performs radio communication using a transmission frame defined by a first period including a plurality of slots and a second period not including slots. In the communication system disclosed in Japanese unexamined Patent Application publication No. 2010-124330, it is disclosed that a terminal device transmits data by selecting either the first period or the second period determined according to a distance from an intersection. Each of the radio terminal devices 300, 300a, and 300b described in the first to third embodiments can be combined with the communication system disclosed in Japanese unexamined Patent Application publication No. 2010-124330. In the fourth embodiment, a combination of the radio terminal device 300 according to the first embodiment and the communication system disclosed in Japanese unexamined Patent Application publication No. 2010-124330 will be described. In the fourth embodiment, components having the same functions as those of the first embodiment are denoted by the same reference numerals, and descriptions thereof are omitted.

Figure 18:
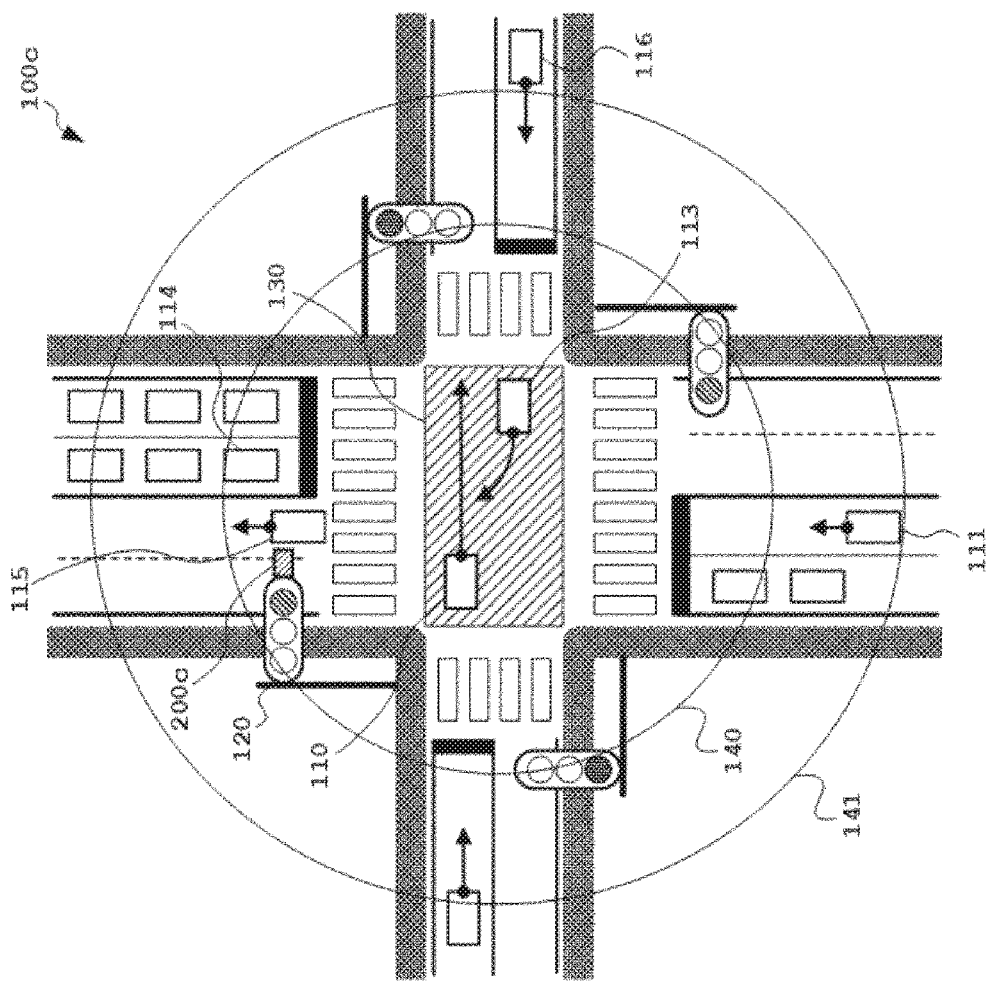
FIG. 18 is a diagram showing an example of a configuration of a communication system according to one embodiment.

FIG. 18 is a diagram showing an example of a configuration of a communication system 100c according to the fourth embodiment. As shown in FIG. 18, a region (first area) inside a boundary 140, a region (second area) sandwiched between the boundary 140 and a boundary 141, and a region (third area) outside the boundary 141 are set in accordance with a magnitude of a radio signal transmitted from the radio control device 200c. It is assumed that the radio signal transmitted from the radio control device 200c do not reach the third area. Originally, the first to third areas expand centering on the radio control device 200c, but in the FIG. 18, for simplicity, the first to third areas are depicted so as to expand centering on the intersecting part 130.

In the first area there are vehicles 110, 113, 114 and 115. In the second area, there is a vehicle 111. In the third area, there is a vehicle 116. It is assumed that a radio terminal device 300c (not shown) which will be described later is mounted on each of these vehicles.

Figure 19:
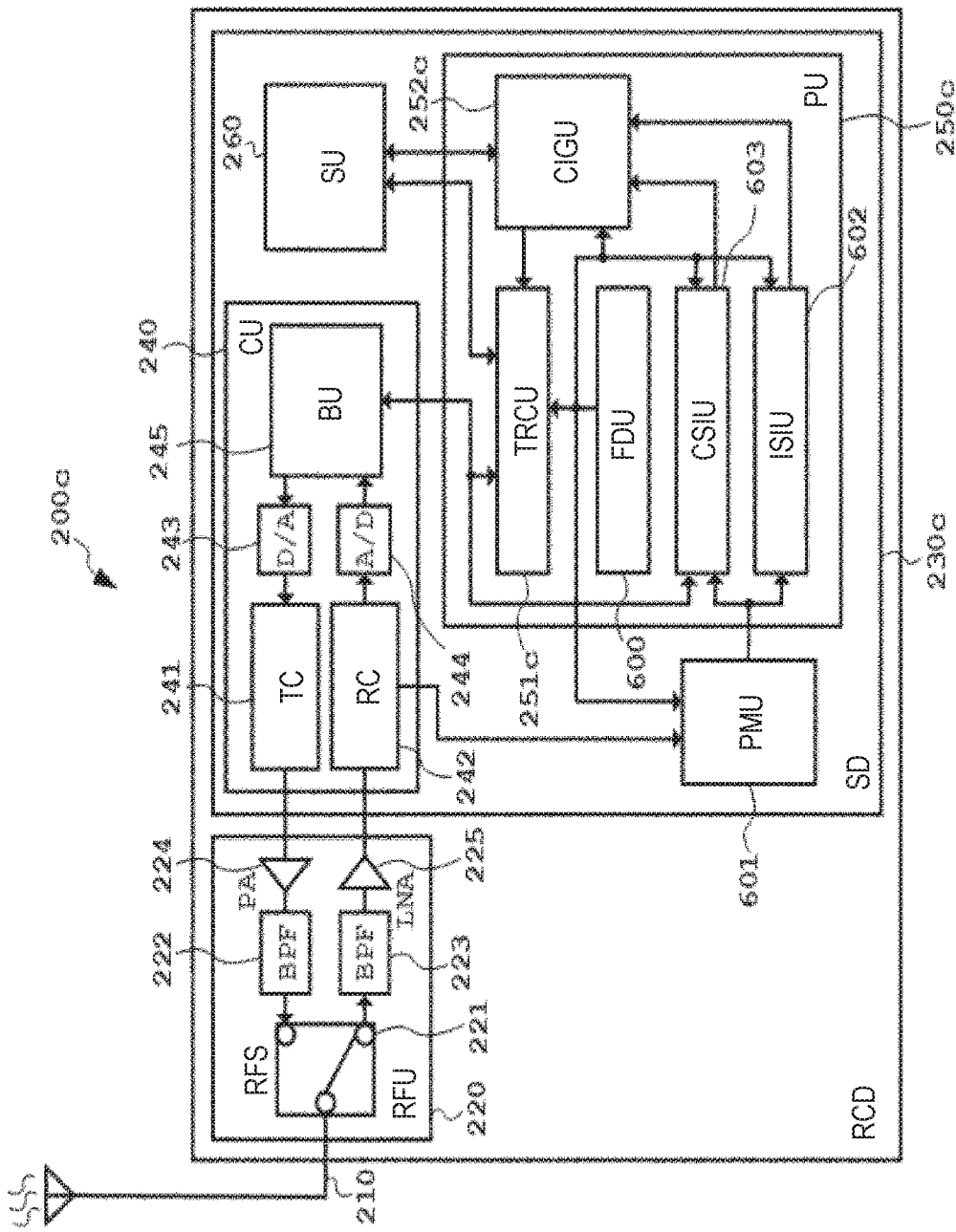
FIG. 19 is a block diagram showing an example of a configuration of a radio control device according to one embodiment.

Next, a configuration of the radio control device 200c according to the fourth embodiment will be described. FIG. 19 is a block diagram showing an example of the configuration of the radio control device (RCD) 200c. As shown in FIG. 19, the radio control device 200c includes a frame defining unit (FDU) 600, a power measurement unit (PMU) 601, an idle slot identification unit (ISIU) 602, and a collision slot identification unit (CSIU) 603, in addition to the configuration of FIG. 2. The power measurement unit 601 is included in the semiconductor device (SD) 230c. The frame defining unit 600, the idle slot identification unit 602, and the collision slot identification unit 603 are included in a processing unit (PU) 250c of the semiconductor device 230c.

The frame defining unit 600 is connected to a control information generation unit (CIGU) 252c, a transmission and reception control unit (TRCU) 251c, the power measurement unit 601, the idle slot identification unit 602, and the collision slot identification unit 603. The frame defining unit 600 divides a transmission frame into a first period and a second period, and further divides the first period into a plurality of slots. The first period, the second period, and a length of the slot are defined as a period having a predetermined length, respectively. The frame defining unit 600 outputs frame configuration information including information on lengths of the first period and the second period, information on the length of the slot and the number of slots, and the like, to the control information generation unit 252c, the transmission and reception control unit 251c, the power measurement unit 601, the idle slot identification unit 602, and the collision slot identification unit 603.

The power measurement unit 601 is connected to the reception circuit 242, the idle slot identification unit 602, and the collision slot identification unit 603. The power measurement unit 601 receives a signal received by the antenna 210 via the reception circuit 242, and measures received power. A measurement of the received power is performed for each slot in the first period based on the frame configuration information received from the frame defining unit 600. The received power measured in units of slots is output to the idle slot identification unit 602 and the collision slot identification unit 603.

The idle slot identification unit 602 compares the received power measured in units of slots with an idle slot threshold value held in advance. The idle slot identification unit 602 determines that a slot whose reception power is smaller than the idle slot threshold value is a slot which is not used for data transmission, and specifies the slot as an idle slot. The idle slot identification unit 602 is connected to the control information generation unit 252c, refers to the frame configuration information received from the frame defining unit 600, and outputs a slot number of the slot specified as the idle slot to the control information generation unit 252c as idle slot information. It is assumed that a plurality of slots included in the first period are sequentially numbered with slot numbers from the front.

The collision slot identification unit 603 is connected to the baseband unit 245, and measures signal quality (error rate) for each slot in the first period using a known art based on a demodulation result output from the baseband unit 245. The collision slot identification unit 603 associates the received power from the power measurement unit 601 with the measured error rate, compares the received power with a first collision slot threshold value held in advance in units of slots, and compares the error rate with a second collision slot threshold value held in advance in units of slots. The collision slot identification unit 603 determines that a slot whose received power is larger than the first collision slot threshold value and error rate is worse than the second collision slot threshold value is a slot used for a plurality of data transmission, and specifies the slot as a collision slot. The collision slot identification unit 603 is connected to the control information generation unit 252c, refers to the frame configuration information received from the frame defining unit 600, and outputs a slot number of the slot specified as the collision slot to the control information generation unit 252c as collision slot information.

The control information generation unit 252c generates control information including the frame configuration information received from the frame defining unit 600, the idle slot information received from the idle slot identification unit 602, and the collision slot information received from the collision slot identification unit 603, and sends the generated control information to the transmission and reception control unit 251c.

The transmission and reception control unit 251c refers to the frame configuration information and assigns the control information to a first slot (slot number 0) included in a first period. The transmission and reception control unit 251c outputs the control information to the baseband unit 245 using the slot number 0.

Figure 20:
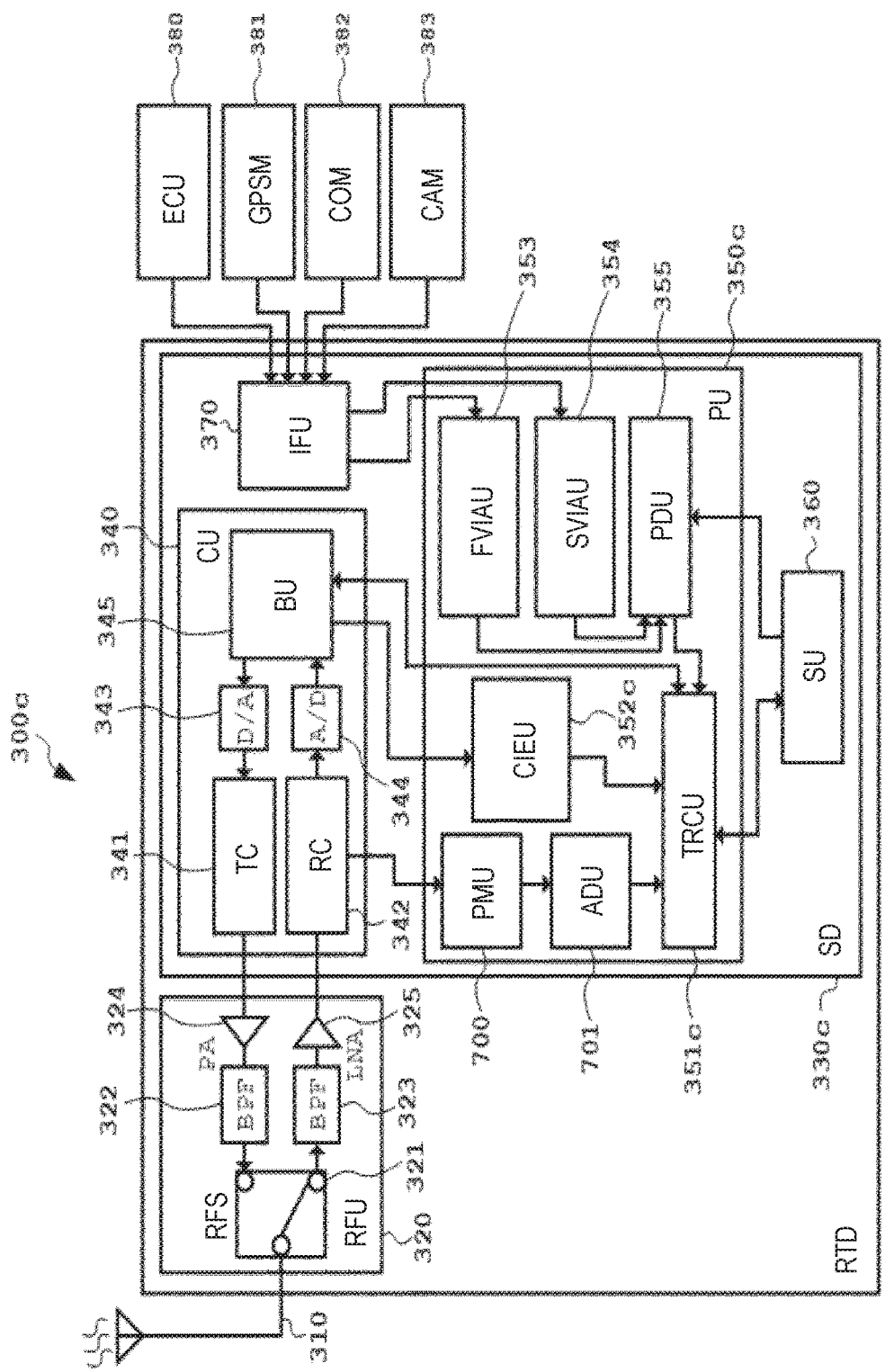
FIG. 20 is a block diagram showing an example of a configuration of a radio terminal device according to one embodiment.

Next, a configuration of the radio terminal device 300c according to the fourth embodiment will be described. FIG. 20 is a block diagram showing an example of the configuration of the radio terminal device (RTD) 300c according to the fourth embodiment. As shown in FIG. 20, the radio terminal device 300c includes a power measurement unit (PMU) 700 and an area determination unit (ADU) 701 in addition to the configuration of FIG. 4. The power measurement unit 700 and the area determination unit 701 are included in a processing unit (PU) 350c of the semiconductor device (SD) 330c.

The power measurement unit 700 is connected to the reception circuit 342 and the area determination unit 701. The power measurement unit 700 receives a signal received by the antenna 310 via the reception circuit 342, and measures received power. The measured received power is output to the area determination unit 701.

The area determination unit 701 compares the received power from the power measurement unit 700 with an area determination threshold value held in advance, and determines whether or not an own vehicle on which the radio terminal device 300c is mounted is located in an area of any of the first area and the second area. For example, if the received power is equal to or higher than the area determination threshold value, it is determined that the own vehicle is located in the first area. On the other hand, if the received power is less than the area determination threshold value, it is determined that the own vehicle is located in the second area. Further, the area determination unit 701 is connected to a transmission and reception control unit (TRCU) 351c, and outputs the determined area (area information) to the transmission and reception control unit 351c.

A control information extraction unit (CIEU) 352c extracts frame configuration information, idle slot information, and collision slot information included in control information. The extracted information is included in generated timing adjustment information, and output to the transmission and reception control unit 351c.

The transmission and reception control unit 351c selects, based on the area information, either the first period or the second period as a period for performing data transmission.

When the transmission and reception control unit 351c selects the first period as the period for performing the data transmission, the transmission and reception control unit 351c selects one of idle slots with reference to the idle slot information. The transmission and reception control unit 351c refers to the frame configuration information and allocates transmission data to the selected idle slot. The transmission and reception control unit 351c outputs the transmission data to the baseband unit 345 using the selected idle slot. The transmission and reception control unit 351c holds information on the selected idle slot, and outputs transmission data using the slot of the same slot number even in the first period of the next transmission frame.

In addition, the transmission and reception control unit 351c refers to the collision slot information to confirm whether or not the slot number corresponding to the currently used slot is specified as a slot number of a collision slot. When the currently used slot is specified as the collision slot, the transmission and reception control unit 351c refers to the idle slot information and reselects one of idle slots.

On the other hand, when the transmission and reception control unit 351c selects the second period as the period for performing the data transmission, the transmission and reception control unit 351c outputs, based on the timing adjustment information, the transmission data to the baseband unit 345 using the second period. The data transmission using the second period is performed using the same method as that of the first embodiment.

Figure 21:
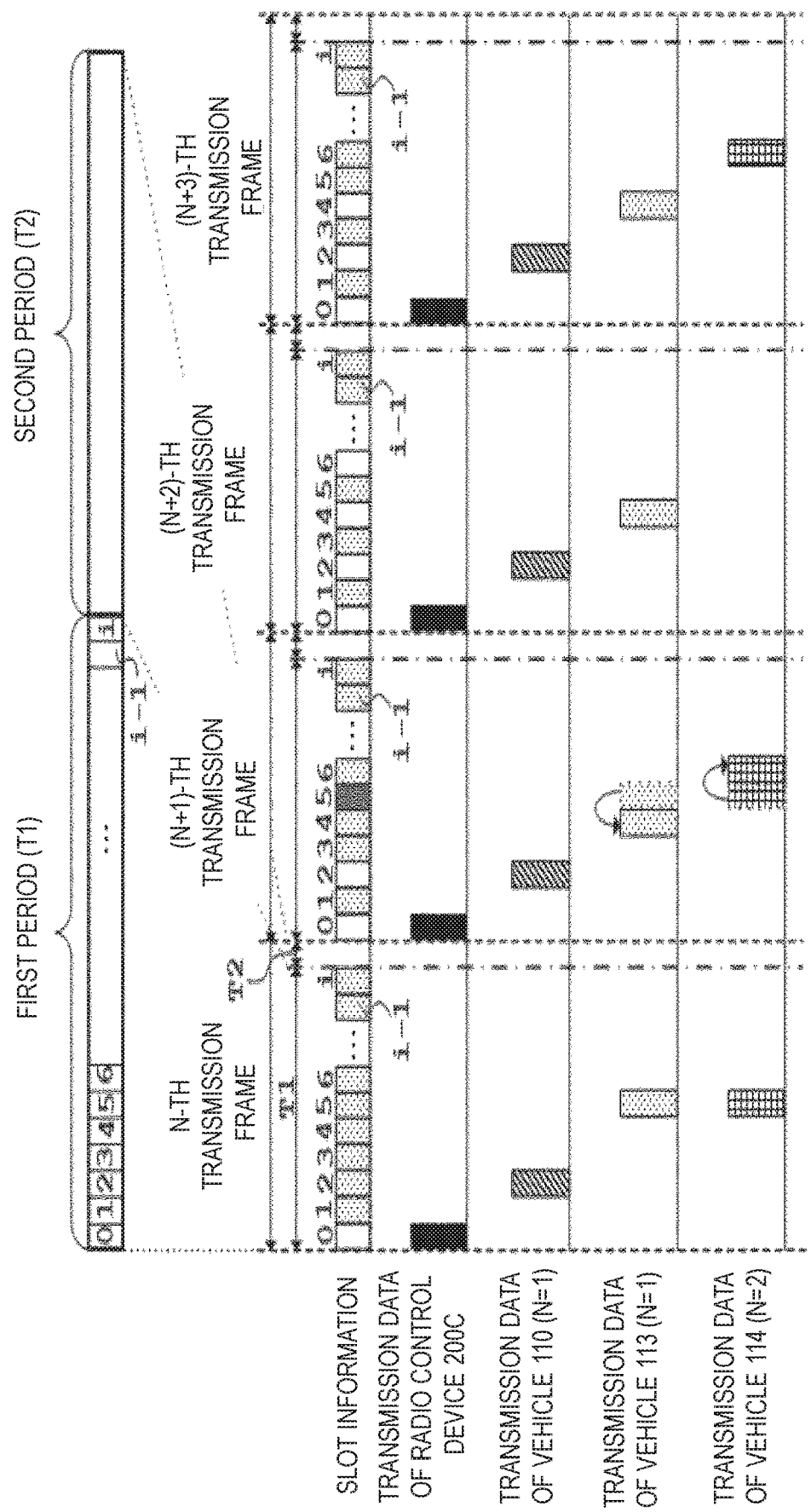
FIG. 21 is a timing chart showing an example of a transmission operation of the radio terminal device according to one embodiment.

Next, referring to FIG. 21, a transmission operation of the radio terminal device 300c according to the fourth embodiment will be described. FIG. 21 is a timing chart showing an example of the transmission operation of the radio terminal device 300c. A lateral direction of FIG. 21 corresponds to time, and four transmission frames of an n-th to (n+3)-th are shown. In a vertical direction of FIG. 21, slot information, transmission data (control information) of the radio control device 200c, and transmission data of the radio terminal devices 300c mounted on the vehicles 110, 113, and 114 (transmission data of vehicles 110, 113, and 114) are shown. Here, the radio terminal device 300c mounted on the vehicle 110 and the radio terminal device 300c mounted on the vehicle 113 set an N value to 1 based on first and second vehicle information of the own vehicle, respectively. Therefore, a transmission period of transmission data of the radio terminal device 300c mounted on the vehicle 110 and a transmission period of transmission data of the radio terminal device 300c mounted on the vehicle 113 are the same as a transmission period (basic transmission period) of a transmission frame. Further, the radio terminal device 300c mounted on the vehicle 114 sets an N value to 2 based on first and second vehicle information of the own vehicle. Therefore, a transmission period of transmission data of the radio terminal device 300c mounted on the vehicle 114 is 2 times the transmission period of the transmission frame.

As shown in FIG. 21, each transmission frame includes a first period (T1) and a second period (T2), and the first period includes i+1 slots. A first slot (slot number 0) in the first period of each transmission frame is used for the radio control device 200c to transmit control information. Since slot information drawn in each transmission frame is information included in control information transmitted in the first slot of the same transmission frame, the slot information corresponds to slot information on the immediately preceding transmission frame. As slot information, it is assumed that a textured slot indicates an idle slot, a colored slot indicates a collision slot, and a blank slot indicates a used slot. Also, as shown in FIG. 18, since the vehicles 110, 113, and 114 are all located in the first areas, the radio terminal devices 300c mounted on these vehicles perform data transmission using the first time period.

In the n-th transmission frame, the radio terminal device 300c mounted on the vehicle 110 selects a slot number 2 as a slot used for data transmission by referring to idle slot information included in control information, and performs data transmission. The radio terminal devices 300c mounted on the vehicles 113 and 114 select a slot number 5 from idle slots and perform data transmission. The radio terminal devices 300c mounted on the vehicles 110, 113, and 114 hold the slot number used for data transmission, respectively.

In the (n+1)-th transmit frame, the radio terminal devices 300c mounted on the vehicles 110, 113, and 114 refer to collision slot information included in control information, and confirm whether or not the slot numbers of the currently used slots are specified as slot numbers of collision slots. Here, the radio terminal device 300c mounted on the vehicle 110 confirms that the slot number of the currently used slot is not specified as the slot number of the collision slot, and performs data transmission using the slot corresponding to the slot number 2 based on the set N value (N=1). On the other hand, the radio terminal devices 300c mounted on the vehicles 113 and 114 recognize that the currently used slot is specified as the collision slot based on the collision slot information included in the control information. Therefore, the radio terminal device 300c mounted on the vehicle 113 refers to idle slot information included in the control information, and reselects a slot used for data transmission. The radio terminal device 300c mounted on the vehicle 113 reselects a slot number 4 and performs data transmission. Similarly, the radio terminal device 300c mounted on the vehicle 114 reselects a slot number 6 and performs data transmission.

In the (n+2)-th transmission frame, the radio terminal device 300c mounted on the vehicle 110 performs data transmission using continuously the slot corresponding to the slot number 2 based on the set N value (N=1). The radio terminal devices 300c mounted on the vehicles 113 and 114 refer to collision slot information included in control information, and confirm whether or not the slot numbers of the currently used slots are specified as slot numbers of collision slots. Here, the radio terminal devices 300c mounted on the vehicles 113 and 114 confirm that the slot numbers 4 and 6 of the currently used slots are not specified as the slot numbers of the collision slots. The radio terminal device 300c mounted on the vehicle 113 performs data transmission using the currently used slot whose slot number is 4 based on the set N value (N=1). On the other hand, the radio terminal device 300c mounted on the vehicle 114 does not perform data transmission in the present transmission frame because the N value is set to 2.

In the (n+3)-th transmission frame, the radio terminal device 300c mounted on the vehicle 110 performs data transmission using continuously the slot corresponding to the slot number 2 based on the set N value (N=1). The radio terminal devices 300c mounted on the vehicles 113 and 114 also perform data transmission using continuously the slots corresponding to the slot numbers 4 and 6 based on the set N values (N=1, 2).

According to the fourth embodiment, the radio terminal device 300c can perform data transmission using a slot included in a first period of a transmission frame. At this time, since a transmission period of transmission data of the radio terminal device 300c is determined based on vehicle information, radio communication with a sufficient communication band can be realized even in a location where many vehicles gather, such as an intersection.

Although the combination of the first embodiment and the art disclosed in Japanese unexamined Patent Application publication No. 2010-124330 has been described in the fourth embodiment, a combination of the second embodiment or the third embodiment and the art disclosed in Japanese unexamined Patent Application publication No. 2010-124330 can also be used. In particular, the vehicle 116 located in the third area in FIG. 18 cannot receive a transmission frame (control information) transmitted from the radio control device 200c. Therefore, by incorporating the function of the control information monitoring unit 400 of the radio terminal device 300a according to the second embodiment, the radio terminal device 300c mounted on the vehicle 116 can perform data transmission processing even in a situation where the transmission frame from the radio control device 200c cannot be received.

In the fourth embodiment, the radio control device 200c includes frame configuration information in control information and transmits the control information to the radio terminal device 300c, but in a system in which communication protocols such as a length of a first period, a length of a slot, and the number of slots are determined in advance, the radio control device 200c does not need to transmit the frame configuration information to the radio terminal device 300c.

Modification of Fourth Embodiment

Next, a modification of the fourth embodiment will be described. In the modification of the fourth embodiment, the first period of the fourth embodiment is divided into a priority terminal period and a non-priority terminal period. In the priority terminal period, the radio terminal device 300c in which an N value is set to 1 performs data transmission, and in the non-priority terminal period, the radio terminal device 300c in which an N value is set to a value larger than 1 performs data transmission.

In the radio control device 200c according to the modification of the fourth embodiment, the frame defining unit 600 divides the first period into the priority terminal period and the non-priority terminal period. The frame defining unit 600 generates frame configuration information including information on lengths of the priority terminal period and the non-priority terminal period or the number of slots included in these periods.

In the radio terminal device 300c according to the modification of the fourth embodiment, when the transmission and reception control unit 351c selects data transmission in the first period based on area information, the transmission and reception control unit 351c selects either the priority terminal period or the non-preferred terminal period by referring to an N value output from the period determination unit 355. When an N value is 1, the priority terminal period is selected, and when an N value is larger than 1, the non-priority terminal period is selected. An operation of data transmission in the priority terminal period of the first period according to the modification of the fourth embodiment is the same as that of data transmission in the first period according to the fourth embodiment. However, an operation of data transmission in the non-priority terminal period of the first period according to the modification of the fourth embodiment differs from that of data transmission in the first period according to the fourth embodiment when a slot collision occurs.

FIG. 22 is a timing chart showing an example of a transmission operation of the radio terminal device 300c according to the modification of the fourth embodiment. A lateral direction of FIG. 22 corresponds to time, and six transmission frames of an n-th to (n+5)-th are shown. In a vertical direction of FIG. 22, slot information, transmission data of the radio terminal devices 300c mounted on the vehicles 114 and 115 (transmission data of vehicles 114 and 115) are shown. Here, the radio terminal device 300c mounted on the vehicle 114 sets an N value to 2 based on first and second vehicle information of the own vehicle. Therefore, a transmission period of transmission data of the radio terminal device 300c mounted on the vehicle 114 is 2 times the transmission period of the transmission frame. The radio terminal device 300c mounted on the vehicle 115 sets an N value to 3 based on first and second vehicle information of the own vehicle. Therefore, a transmission period of transmission data of the radio terminal device 300c mounted on the vehicle 115 is three times the transmission period of the transmission frame.

As shown in FIG. 22, each transmission frame includes a first period (T1) and a second period (T2), and the first period is further divided into a priority terminal period (T11) and a non-priority terminal period (T12). The priority terminal period includes k+1 slots, and the non-priority terminal period includes j+1 slots. A notation of slot information is the same as that of FIG. 21. As shown in FIG. 18, the vehicles 114 and 115 are both located in the first area. Since the radio terminal devices 300c mounted on the vehicle 114 and the vehicle 115 both set the N value to a value larger than 1, the radio terminal devices 300c mounted on the vehicles 114 and 115 perform data transmission using the non-priority terminal period of the first period.

In the n-th transmission frame, the radio terminal devices 300c mounted on the vehicles 114 and 115 refer to idle slot information, select a slot number 1, and perform data transmission.

In the (n+1)-th transmit frame, the radio terminal devices 300c mounted on the vehicles 114 and 115 recognizes that the currently used slot is specified as a collision slot based on collision slot information. In the fourth embodiment, when a slot collision is recognized, a slot used for data transmission is reselected by immediately referring to idle slot information. However, in the modification of the fourth embodiment, data transmission in the same slot is attempted until the number of data transmission using the same slot is the same as the N value. Therefore, despite recognizing the slot collision, the radio terminal devices 300c mounted on the vehicles 114 and 115 use the currently used slot whose slot number is 1 again.

In the (n+2)-th transmit frame, the radio terminal devices 300c mounted on the vehicles 114 and 115 refer to collision slot information to recognize again that the currently used slot is a collision slot. At this time, in the radio terminal device 300c mounted on the vehicle 114, the N value is 2, which corresponds to the number of data transmission in the same slot. Therefore, the radio terminal device 300c mounted on the vehicle 114 refers to idle slot information and reselects a slot used for data transmission. The radio terminal device 300c mounted on the vehicle 114 reselects a slot number 3 and performs data transmission. On the other hand, because the N value is 3, which does not match 2 which is the number of data transmission in the same slot, the radio terminal device 300c mounted in the vehicle 115 attempts to perform data transmission using the same slot (slot number 1).

In the (n+3)-th transmit frame, the radio terminal devices 300c mounted on the vehicles 114 and 115 refer to collision slot information and confirm whether or not the slot numbers of the currently used slots are specified as slot numbers of collision slots. Here, the radio terminal devices 300c mounted on the vehicles 114 and 115 confirm that the slot numbers 3 and 1 of the currently used slots are not specified as the slot numbers of the collision slots, but do not perform data transmission in the present transmission frame because the N values are set to 2 and 3.

In the (n+4)-th transmission frame, the radio terminal device 300c mounted on the vehicle 114 performs data transmission based on the set N value (N=2) using the currently used slot whose slot number is 3. On the other hand, the radio terminal device 300c mounted in the vehicle 115 does not perform data transmission in the present transmission frame because the N value is set to 3.

In the (n+5)-th transmit frame, the radio terminal device 300c mounted on the vehicle 114 refers to collision slot information and confirms whether or not the slot number of the currently used slot is specified as a slot number of a collision slot. Here, the radio terminal device 300c mounted on the vehicle 114 confirms that the slot number 3 of the currently used slot is not specified as the slot number of the collision slot, but does not perform data transmission in the present transmission frame because the N value is set to 2. The radio terminal device 300c mounted on the vehicle 115 refers to idle slot information to confirms whether or not the currently used slot whose slot number is 1 is an idle slot. Here, the radio terminal device 300c mounted on the vehicle 115 confirms that the slot number 1 is the idle slot based on the idle slot information, and performs data transmission using the slot corresponding to the slot number 1 based on the set N value (N=3). If the slot number 1 is not the idle slot, the radio terminal device 300c mounted on the vehicle 115 refers to the idle slot information and reselects an idle slot.

According to the modification of the fourth embodiment, even if a slot collision occurs in a non-priority terminal period of a first period, the radio terminal device 300c repeats data transmission using the same slot until the number of consecutive data transmission in the same slot matches an N value. According to this method, in the non-priority terminal period, the radio terminal device 300c may not be able to perform data transmission in the same slot up to the same number as the N value. However, at this time, the radio terminal device 300c is set to perform data transmission at N times the transmission period of the transmission frame, and even if the data transmission fails the same number of times as the N value, the effect is small.

In the modification of the fourth embodiment, a first period is divided into a priority terminal period and a non-priority terminal period, and the radio terminal device 300c in which an N value is set to 1 can preferentially perform data transmission using the priority terminal period. In other words, an opportunity for communication by a vehicle having a higher priority of information transmission is sufficiently secured.

Since the radio control device 200c is configured to be able to grasp a use rate of slots in a priority terminal period and a non-priority terminal period, when there are insufficient slots in the priority terminal period, the number of slots can be adjusted so as to increase the number of slots in the priority terminal period, or data can be transmitted using empty slots in the non-priority terminal period. The radio control device 200c can also perform data transmission using a second period when the number of slots in a non-priority terminal period is insufficient.

Further, in the first to fourth embodiment, although it has been described that the radio terminal device 300 is mounted on a vehicle, the term "mounted on a vehicle" here is not limited to an aspect in which the radio terminal device 300 is incorporated in a vehicle body as a part of a component. An aspect in which a mobile terminal such as a smartphone capable of operating application software for realizing the functions of the first to fourth embodiments is brought into a vehicle may also be included.

Although the invention made by the present inventors has been specifically described based on the embodiments, it is needless to say that the present invention is not limited to the above-described embodiments, and various changes may be made without departing from the scope thereof.

What is claimed is:

1. A semiconductor device for controlling a radio terminal device mounted on a first vehicle, a semiconductor device comprising:
    a communication circuit configured to receive a frame transmitted from a radio control device at a first transmission period, demodulate control information from the received frame, modulate transmission data, and broadcast the modulated transmission data at a second transmission period as a radio frequency packet signal;
    a processing circuit configured to:
    determine the second transmission period based on vehicle information of the first vehicle;
    generate a transmission timing trigger signal for determining a transmission timing of the transmission data based on the control information and the second transmission period; and
    output the transmission data to the communication circuit in synchronization with the transmission timing trigger signal, wherein the second transmission period is equal to or longer than the first transmission period; and
    a storage unit configured to store a vehicle information table which is associated with the vehicle information and defines a correction value for adjusting the second transmission period,
    wherein the processing circuit is further configured to:
    refer to the vehicle information table and read the correction value associated with the vehicle information; and
    determine, based on the read correction value, a parameter N (N is an integer and larger than 0) for determining the second transmission period.

2. The semiconductor device according to claim 1, wherein the processing circuit includes a transmission control counter for counting in response to the control information, and
    the processing circuit is configured to generate the transmission timing trigger signal when a value of the parameter N and a count value of the transmission control counter coincide with each other.

3. The semiconductor device according to claim 1, wherein the processing circuit sets the second transmission period to a period obtained by multiplying the first transmission period by a value of the parameter N.

4. The semiconductor device according to claim 3, wherein the communication circuit is configured to receive a radio signal transmitted form a radio terminal device mounted on a second vehicle and demodulate data from the received radio signal,
    wherein the processing circuit is configured to generate a busy signal indicating a use state of a radio channel based on the control information and the data, and measure a period where the busy signal becomes an active state in a unit time, wherein the processing circuit is configured to calculate a channel use rate per the unit time based on a count value obtained by measuring the period, and wherein the processing circuit is configured to increase the value of the parameter N determined based on the correction value when the calculated channel use rate is larger than a second threshold value.

5. The semiconductor device according to claim 2, wherein the processing circuit is configured to:

measure received power of a radio signal received by the communication circuit; and compare the received power with a third threshold value to determine whether the first vehicle is located in an area of any of first and second areas determined according to a magnitude of a radio signal transmitted from the radio control device, wherein the frame received by the communication circuit includes a first period and a second period, wherein the first period includes a plurality of slots, wherein the control information includes idle slot information, and wherein the processing circuit is configured to:

select the first period as a period for transmitting the transmission data when the determined area is the first area;

select the second period as the period for transmitting the transmission data when the determined area is the second area; and select one of the slots included in the first period by referring to the idle slot information when selecting the first period as the period for transmitting the transmission data, and output the transmission data to the communication circuit by allocating the transmission data to a selected idle slot.

6. The semiconductor device according to claim 5, wherein the control information further includes collision slot information, wherein the processing circuit is configured to:

check whether the slot used for transmitting the transmission data is identified as a collision slot by referring to the collision slot information in a frame received immediately after the transmission data is transmitted using the first period;

reselect another slot for transmitting the transmission data by referring to the idle slot information to transmit the transmission data using the another slot reselected when the used slot is identified as the collision slot; and determine whether to transmit the transmission data based on the count value of the transmission control counter when the used slot is not identified as the collision slot.

7. The semiconductor device according to claim 2, wherein the processing circuit is configured to:

measure received power of a radio signal received by the communication circuit; and compare the received power with a third threshold value to determine whether the first vehicle is located in an area of any of first and second areas determined according to a magnitude of a radio signal transmitted from the radio control device, wherein the frame received by the communication circuit includes a first period and a second period, wherein the first period includes a priority terminal period and a non-priority terminal period, wherein each of the priority terminal period and a non-priority terminal period includes a plurality of slots, wherein the control information includes idle slot information and collision slot information, and wherein the processing circuit is configured to:

select the priority terminal period as a period for transmitting the transmission data when the determined area is the first area and the value of the parameter N is 1;

select the non-priority terminal period as the period for transmitting the transmission data when the determined area is the first area and the value of the parameter N is larger than 1;

select the second period as the period for transmitting the transmission data when the determined area is the second area;

select one of the slots included in the priority terminal period or the non-priority terminal period by referring to the idle slot information when selecting the priority terminal period or the non-priority terminal period as the period for transmitting the transmission data, and output the transmission data to the communication circuit by allocating the transmission data to a selected idle slot;

check whether the slot used for transmitting the transmission data is identified as a collision slot by referring to the collision slot information in a frame received immediately after the transmission data is transmitted using the non-priority terminal period;

reselect another slot for transmitting the transmission data by referring to the idle slot information to transmit the transmission data using the another slot reselected when the used slot is identified as the collision slot and a number of consecutive transmissions in the same slot reaches the value of the parameter N;

transmit the transmission data using the same slot again when the used slot is identified as the collision slot and the number of consecutive transmissions in the same slot does not reach the value of the parameter N; and determine whether to transmit the transmission data based on the count value of the transmission control counter when the used slot is not identified as the collision slot.

* * * * *